(12) United States Patent
Matsuno et al.

(10) Patent No.: US 10,619,069 B2
(45) Date of Patent: Apr. 14, 2020

(54) CHEMICAL CONVERSION-TREATED STEEL SHEET AND METHOD FOR PRODUCING SAME, AND CHEMICAL CONVERSION TREATMENT SOLUTION

(71) Applicant: NISSHIN STEEL CO., LTD., Tokyo (JP)

(72) Inventors: Masanori Matsuno, Osaka (JP); Masaya Yamamoto, Osaka (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 114 days.

(21) Appl. No.: 15/128,273

(22) PCT Filed: Mar. 27, 2015

(86) PCT No.: PCT/JP2015/001777
§ 371 (c)(1),
(2) Date: Sep. 22, 2016

(87) PCT Pub. No.: WO2015/146188
PCT Pub. Date: Oct. 1, 2015

(65) Prior Publication Data
US 2017/0096573 A1    Apr. 6, 2017

(30) Foreign Application Priority Data

Mar. 27, 2014   (JP) ................... 2014-066481
Oct. 30, 2014   (JP) ................... 2014-221602
(Continued)

(51) Int. Cl.
*C23C 22/34* (2006.01)
*C09D 5/02* (2006.01)
(Continued)

(52) U.S. Cl.
CPC ............. *C09D 127/12* (2013.01); *B05D 7/14* (2013.01); *C09D 5/024* (2013.01); *C09D 5/086* (2013.01);
(Continued)

(58) Field of Classification Search
None
See application file for complete search history.

(56) References Cited

U.S. PATENT DOCUMENTS 7,291,402 B2 * 11/2007 Kazuhisa ........... C08G 59/4035
427/372.2
2006/0019089 A1    1/2006 Leininger
(Continued)

FOREIGN PATENT DOCUMENTS

CN    101117461 A    2/2008
JP    2000-154338 A   6/2000
(Continued)

OTHER PUBLICATIONS

International Search Report from International Application No. PCT/JP2015/001777 dated Jun. 23, 2015.
(Continued)

*Primary Examiner* — Elizabeth A Robinson
*Assistant Examiner* — Daniel D Lowrey
(74) *Attorney, Agent, or Firm* — Brundidge & Stanger, P.C.

(57) ABSTRACT

This chemical conversion-treated steel sheet (10) has a chemical conversion treatment coating (12) upon a plating layer (17) of a steel sheet (11). The chemical conversion treatment coating (12) contains a fluororesin, a base resin which is a resin other than a fluororesin, metal flakes (13), and a chemical conversion treatment component. The content of the fluororesin in relation to the total quantity of resins is 3.0 mass % or more in terms of fluorine atoms, the
(Continued)

content of the base resin in relation to 100 parts by mass of the fluororesin is 10 parts by mass or more, and the content of metal flakes (13) in the chemical conversion treatment coating (12) is more than 20 mass % but at most 60 mass %.

11 Claims, 1 Drawing Sheet

(30) Foreign Application Priority Data

Dec. 26, 2014 (JP) .................. 2014-265602
Mar. 27, 2015 (JP) .................. 2015-065617

(51) Int. Cl.

| | | |
|---|---|---|
| C09D 127/12 | (2006.01) | |
| C23C 28/00 | (2006.01) | |
| C23C 22/40 | (2006.01) | |
| C23C 22/36 | (2006.01) | |
| B05D 7/14 | (2006.01) | |
| C09D 7/40 | (2018.01) | |
| C09D 5/08 | (2006.01) | |
| C09D 167/00 | (2006.01) | |
| C09D 175/04 | (2006.01) | |
| C23C 18/48 | (2006.01) | |
| C23C 22/05 | (2006.01) | |
| C23C 22/80 | (2006.01) | |
| B05D 5/08 | (2006.01) | |

(52) U.S. Cl.
CPC ............ *C09D 7/70* (2018.01); *C09D 167/00* (2013.01); *C09D 175/04* (2013.01); *C23C 18/48* (2013.01); *C23C 22/05* (2013.01); *C23C 22/34* (2013.01); *C23C 22/361* (2013.01); *C23C 22/40* (2013.01); *C23C 22/80* (2013.01); *C23C 28/00* (2013.01); *B05D 5/083* (2013.01); *B05D 2350/65* (2013.01); *C23C 2222/20* (2013.01)

(56) References Cited

U.S. PATENT DOCUMENTS

| | | |
|---|---|---|
| 2008/0022899 A1 | 1/2008 | Tsuji et al. |
| 2008/0199714 A1* | 8/2008 | Witteler .................. C09D 5/08 428/545 |
| 2013/0160898 A1 | 6/2013 | Matsuno et al. |
| 2014/0287257 A1 | 9/2014 | Morishita et al. |

FOREIGN PATENT DOCUMENTS

| | | |
|---|---|---|
| JP | 2004-052000 A | 2/2004 |
| JP | 2004-084024 A | 3/2004 |
| JP | 2005-256018 A | 9/2005 |
| JP | 3128852 U | 1/2007 |
| JP | 3164654 U | 12/2010 |
| JP | 2011038026 A * | 2/2011 |
| JP | 2012-026182 A | 2/2012 |
| JP | 2012-177147 A | 9/2012 |
| JP | 2012-233264 A | 11/2012 |
| WO | 2011/158513 A1 | 12/2011 |
| WO | WO-2013065354 A1 * | 5/2013 ............... C09D 5/08 |

OTHER PUBLICATIONS

Office Action issued in U.S. Appl. No. 15/520,352, dated Mar. 19, 2018.

* cited by examiner

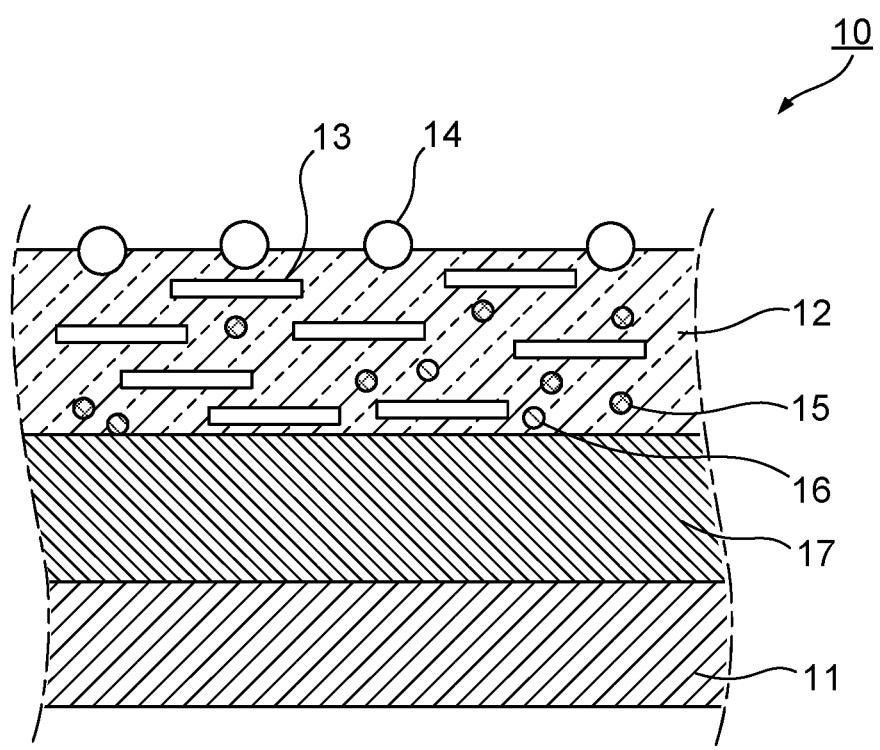

CHEMICAL CONVERSION-TREATED STEEL SHEET AND METHOD FOR PRODUCING SAME, AND CHEMICAL CONVERSION TREATMENT SOLUTION

TECHNICAL FIELD

The present invention relates to a chemical conversion-treated steel sheet and a method for producing the same, and a chemical conversion treatment solution.

BACKGROUND ART

Plated steel sheets are suitably used for exterior building materials. Plated steel sheets to be used for exterior building materials are required to have weatherability. As the plated steel sheet, known are chemical conversion-treated steel sheets including a plated steel sheet including a zinc-based plating layer containing aluminum and a chemical conversion treatment coating film which is disposed on the plated steel sheet and contains a fluororesin, a non-fluororesin, and a 4A metal compound (e.g., see PTL 1). The chemical conversion-treated steel sheet has weatherability sufficient for exterior building materials.

CITATION LIST

Patent Literature

PTL 1
WO2011/158513

SUMMARY OF INVENTION

Technical Problem

The chemical conversion-treated steel sheet has weatherability sufficient for exterior building materials. However, the chemical conversion-treated steel sheet has a high gloss. Thus, the gloss is required to be reduced in consideration for the surrounding environment of a building. In addition, the chemical conversion-treated steel sheet may discolor over time after exposure due to the oxidation of the plating surface.

The present invention provides a chemical conversion-treated steel sheet which has weatherability and exhibits suppressed gloss and suppressed discoloration over time.

Solution to Problem

The present inventors have found that use of a fluororesin excellent in weatherability and a non-fluororesin and a metal flake in combination as a material for a chemical conversion treatment coating film on a plated steel sheet provides a chemical conversion-treated steel sheet which has a moderate gloss and does not undergo the above-mentioned discoloration over time, and further studied to complete the present invention.

Specifically, the present invention provides the following chemical conversion-treated steel sheets.

[1] A chemical conversion-treated steel sheet including: a plated steel sheet including a steel sheet and a plating layer disposed on the surface of the steel sheet; and a chemical conversion treatment coating film disposed on the surface of the plating layer, in which the plating layer contains a zinc alloy containing 0.05 to 60 mass % of aluminum and 0.5 to 4.0 mass % of magnesium, the chemical conversion treatment coating film contains a fluororesin, a base resin, a metal flake, and a chemical conversion treatment component, the base resin is one or more selected from the group consisting of a polyurethane, a polyester, an acrylic resin, an epoxy resin, and a polyolefin, the content of the fluororesin relative to the total amount of the fluororesin and the base resin is 3.0 mass % or more in terms of fluorine atoms, the content of the base resin relative to 100 parts by mass of the fluororesin in the chemical conversion treatment coating film is 10 parts by mass or more, and the content of the metal flake in the chemical conversion treatment coating film is more than 20 mass % and 60 mass % or less.

[2] The chemical conversion-treated steel sheet according to [1], in which the metal flake is one or more selected from the group consisting of an aluminum flake, an aluminum alloy flake, and a stainless steel flake.

[3] The chemical conversion-treated steel sheet according to [1] or [2], in which the chemical conversion treatment coating film has a film thickness of 0.5 to 10 µm.

[4] The chemical conversion-treated steel sheet according to any one of [1] to [3], in which the content of the base resin relative to 100 parts by mass of the fluororesin in the chemical conversion treatment coating film is 900 parts by mass or less.

[5] The chemical conversion-treated steel sheet according to any one of [1] to [4], in which the chemical conversion treatment component includes a 4A metal compound including one or more selected from the group consisting of Ti, Zr, and Hf, and the content of the 4A metal compound in the chemical conversion treatment coating film based on the chemical conversion treatment coating film is 0.005 to 5 mass % in terms of 4A metal.

[6] The chemical conversion-treated steel sheet according to any one of [1] to [5], in which the chemical conversion treatment component includes one or both of a molybdate and a valve metal compound, and the valve metal compound is a compound including one or both of V and Nb.

[7] The chemical conversion-treated steel sheet according to any one of [1] to [6], in which the chemical conversion treatment coating film further contains one or both of a silane coupling agent and a phosphate.

[8] The chemical conversion-treated steel sheet according to any one of [1] to [7], in which the plated steel sheet has been pretreated with a phosphate compound or a valve metal component, and the valve metal component is a component containing one or more selected from the group consisting of Ti, Zr, Hf, V, Nb, Ta, Mo, and W.

[9] The chemical conversion-treated steel sheet according to any one of [1] to [8], in which the chemical conversion treatment coating film further contains a pigment.

[10] The chemical conversion-treated steel sheet according to any one of [1] to [9], in which the chemical conversion treatment coating film further contains a wax.

Further, the present invention provides the following methods for producing a chemical conversion-treated steel sheet.

[11] A method for producing a chemical conversion-treated steel sheet including: applying a chemical conversion treatment solution on a plating layer of a plated steel sheet; and drying the applied chemical conversion treatment solution to manufacture a chemical conversion-treated steel sheet, in which the plating layer is composed of a zinc alloy containing 0.05 to 60 mass % of aluminum and 0.5 to 4.0 mass % of magnesium, the chemical conversion treatment solution contains a fluororesin, a base resin, a metal flake, and a pre-chemical conversion treatment component, the base resin is one or more selected from the group consisting of a polyurethane, a polyester, an acrylic resin, an epoxy resin, and a polyolefin, the content of the fluororesin relative to the total amount of the fluororesin and the base resin in the chemical conversion treatment solution is 3.0 mass % or more in terms of fluorine atoms, the content of the base resin relative to 100 parts by mass of the fluororesin in the chemical conversion treatment solution is 10 parts by mass or more, and the content of the metal flake relative to the solid content in the chemical conversion treatment solution is more than 20 mass % and 60 mass % or less.

[12] The method for producing a chemical conversion-treated steel sheet according to [11], in which the chemical conversion treatment solution contains an emulsion of the fluororesin and an emulsion of the base resin, the particle diameter of the emulsion of the fluororesin is 10 to 300 nm, and the particle diameter of the emulsion of the base resin is 10 to 100 nm.

[13] The method for producing a chemical conversion-treated steel sheet according to [11] or [12], further including pretreating the plated steel sheet with a phosphate compound or a valve metal component before applying the chemical conversion treatment solution, in which the valve metal component is a component containing one or more selected from the group consisting of Ti, Zr, Hf, V, Nb, Ta, Mo, and W.

Furthermore, the present invention provides the following chemical conversion treatment solutions.

[14] A chemical conversion treatment solution containing: a fluororesin, a base resin, a metal flake, and a pre-chemical conversion treatment component, in which the base resin is one or more selected from the group consisting of a polyurethane, a polyester, an acrylic resin, an epoxy resin, and a polyolefin, the content of the fluororesin relative to the total amount of the fluororesin and the base resin in the chemical conversion treatment solution is 3.0 mass % or more in terms of fluorine atoms, the content of the base resin relative to 100 parts by mass of the fluororesin in the chemical conversion treatment solution is 10 parts by mass or more, and the content of the metal flake relative to the solid content in the chemical conversion treatment solution is more than 20 mass % and 60 mass % or less.

[15] The chemical conversion treatment solution according to [14], in which the chemical conversion treatment solution contains an emulsion of the fluororesin and an emulsion of the base resin, the particle diameter of the emulsion of the fluororesin is 10 to 300 nm, and the particle diameter of the emulsion of the base resin is 10 to 100 nm.

Advantageous Effects of Invention

The present invention can provide a chemical conversion-treated steel sheet which has weatherability and exhibits suppressed gloss and suppressed discoloration over time. The chemical conversion-treated steel sheet according to the present invention is not only excellent in weatherability, but also has a good appearance, and thus can be suitably used for exterior building materials.

BRIEF DESCRIPTION OF DRAWING

FIG. 1 schematically illustrates the layered structure of a chemical conversion-treated steel sheet according to one embodiment of the present invention.

DESCRIPTION OF EMBODIMENTS

Now, one example of the present invention will be described.

1. Chemical Conversion-Treated Steel Sheet

A chemical conversion-treated steel sheet according to the present embodiment includes a chemical conversion treatment coating film disposed on the surface of a plated steel sheet. In the following, constituents of the chemical conversion-treated steel sheet according to the present embodiment will be described.

[Plated Steel Sheet]

The type of the plated steel sheet is not limited. The plated steel sheet includes a steel sheet and a plating layer. The plating layer contains a zinc alloy containing 0.05 to 60 mass % of aluminum and 0.5 to 4.0 mass % of magnesium from the viewpoint of corrosion resistance and designability. The thickness of the plated steel sheet may be determined in accordance with an application of the chemical conversion-treated steel sheet, and for example, is 0.2 to 6 mm. The plated steel sheet may be a flat sheet or a corrugated sheet, and the shape in plane of the plated steel sheet may be a rectangle or a shape other than rectangles.

Examples of the plated steel sheet include hot-dip aluminum-magnesium-zinc-plated steel sheets (hot-dip Al—Mg—Zn-plated steel sheets) containing a zinc alloy containing aluminum and magnesium, and hot-dip aluminum-magnesium-silicon-zinc-plated steel sheets (hot-dip Al—Mg—Si—Zn-plated steel sheets) containing a zinc alloy containing aluminum, magnesium and silicon.

Examples of the steel sheet which serves as a substrate of the plated steel sheet (substrate steel sheet) include sheets of low-carbon steel, medium-carbon steel, high-carbon steel, and alloy steel. A configuration in which the substrate steel sheet is a steel sheet for deep drawing of low-carbon Ti-added steel, low-carbon Nb-added steel, etc. is preferred from the viewpoint of enhancement of the processability of the chemical conversion-treated steel sheet.

[Pretreatment Coating Film]

The chemical conversion treatment coating film essentially consists of the plated steel sheet and a chemical conversion treatment coating film described later. Although the plated steel sheet is thus not required to include a coating film other than the chemical conversion treatment coating film, the plated steel sheet may be pretreated with a phosphate compound or a valve metal. Specifically, the plated steel sheet may further include a pretreatment coating film which contains a phosphate compound or a valve metal component and is disposed between the plated steel sheet and a chemical conversion treatment coating film, within a range in which the chemical conversion treatment component described later acts on the surface of the plating layer. The pretreatment coating film is a layer of a component deposited in treating the surface of the plated steel sheet to be provided with a chemical conversion treatment coating film. The pretreatment coating film is preferred from the viewpoint of enhancement of the corrosion resistance of the chemical conversion-treated steel sheet and lowering the gloss of the chemical conversion-treated steel sheet.

Examples of a valve metal as the valve metal component include Ti, Zr, Hf, V, Nb, Ta, Mo, and W. The valve metal component in the pretreatment coating film may be in the same state as in a pretreatment solution described later, or in a state different from that in the pretreatment solution. The valve metal is applied on the plated steel sheet, for example, in a salt state, and is present in a state of an oxide, a hydroxide, or a fluoride in the pretreatment coating film.

Examples of the phosphate compound include orthophosphate salts and polyphosphate salts of metals. The phosphate compound is, for example, present as a soluble or poorly-soluble metal phosphate or composite phosphate in the pretreatment coating film. Examples of the metal of the soluble metal phosphate salt or composite phosphate salt include alkali metals, alkali earth metals, and Mn. Examples of the metal of the poorly-insoluble metal phosphate salt or composite phosphate salt include Al, Ti, Zr, Hf, and Zn.

The presence of the pretreatment coating film can be confirmed through detection of an element specific to the phosphate compound or valve metal when the boundary portion between the chemical conversion treatment coating film and the plated steel sheet is subjected to element analysis such as X-ray fluorescence spectrometry, electron spectroscopy for chemical analysis (ESCA), and glow discharge spectroscopy (GDS).

[Chemical Conversion Treatment Coating Film]

The chemical conversion treatment coating film is a layer of a component deposited in surface-treating the plated steel sheet, and is a layer containing a reaction product (chemical conversion treatment component) of a reaction between the surface of the plating layer and a pre-chemical conversion treatment component in a chemical conversion treatment solution described later. The chemical conversion treatment coating film contains a fluororesin, a base resin, a metal flake, and a chemical conversion treatment component.

The fluororesin is, for example, a thermoplastic resin which melts with a base resin described later in baking a chemical conversion treatment solution described later onto the plated steel sheet to constitute a part of a resin component constituting a resin coating film, and as a result enhances the weatherability (ultraviolet resistance) of the chemical conversion treatment coating film. One fluororesin or one or more fluororesins may be used. The content of the fluororesin relative to the total amount of the fluororesin and the base resin is 3.0 mass % or more in terms of fluorine atoms. When the content of the fluororesin in terms of fluorine atoms is less than 3.0 mass %, the chemical conversion-treated steel sheet may have an insufficient weatherability. The fluorine atom content in the chemical conversion treatment coating film can be measured, for example, by using an X-ray fluorescence spectrometer.

Examples of the fluorine-containing resin include fluorine-containing olefin resins. A fluorine-containing olefin resin is a polymer compound formed by replacing a part or all of the hydrogen atoms in a hydrocarbon group constituting an olefin with a fluorine atom. The fluorine-containing olefin resin is preferably an aqueous fluorine-containing resin further having a hydrophilic functional group from the viewpoint of facilitating handling of the fluororesin in producing the chemical conversion treatment coating film.

Examples of the hydrophilic functional group in the aqueous fluorine-containing resin include a carboxyl group, a sulfonic acid group, and salts thereof. Examples of the salt include ammonium salts, amine salts, and alkali metal salts. The content of the hydrophilic functional group in the aqueous fluorine-containing resin is preferably 0.05 to 5 mass % from the viewpoint of enabling formation of an emulsion of the fluororesin without using an emulsifier. In the case that both a carboxyl group and a sulfonic acid group are present as the hydrophilic functional group, the mole ratio of the carboxyl group to the sulfonic acid group is preferably 5 to 60. The content of the hydrophilic functional group and the number average molecular weight of the aqueous fluorine-containing resin can be measured by using gel permeation chromatography (GPC).

The number average molecular weight of the aqueous fluorine-containing resin is preferably 1,000 or higher, more preferably 10,000 or higher, and particularly preferably 200,000 or higher from the viewpoint of enhancement of the water resistance of the chemical conversion treatment coating film. The number average molecular weight is preferably 2,000,000 or lower from the viewpoint of preventing the chemical conversion treatment coating film from gelling in producing it.

Examples of the aqueous fluorine-containing resin include copolymers of a fluoroolefin and a monomer containing a hydrophilic functional group. Examples of the monomer containing a hydrophilic functional group include carboxyl group-containing monomers and sulfonic acid group-containing monomers.

Examples of the fluoroolefin include tetrafluoroethylene, trifluoroethylene, chlorotrifluoroethylene, hexafluoropropylene, vinyl fluoride, vinylidene fluoride, pentafluoropropylene, 2,2,3,3-tetrafluoropropylene, 3,3,3-trifluoropropylene, bromotrifluoroethylene, 1-chloro-1,2-difluoroethylene, and 1,1-dichloro-2,2-difluoroethylene. Among them, perfluoroolefins such as tetrafluoroethylene and hexafluoropropylene and vinylidene fluoride are preferred from the viewpoint of enhancement of the weatherability of the chemical conversion-treated steel sheet.

Examples of the carboxyl group-containing monomer include unsaturated carboxylic acids and carboxyl group-containing vinyl ether monomers, and esters thereof, and acid anhydrides thereof.

Examples of the unsaturated carboxylic acid include acrylic acid, methacrylic acid, vinylacetic acid, crotonic acid, cinnamic acid, itaconic acid, itaconic acid monoesters, maleic acid, maleic acid monoesters, fumaric acid, fumaric acid monoesters, 5-hexenoic acid, 5-heptenoic acid, 6-heptenoic acid, 7-octenoic acid, 8-nonenoic acid, 9-decenoic acid, 10-undecenoic acid, 11-dodecenoic acid, 17-octadecenoic acid, and oleic acid.

Examples of the carboxyl group-containing vinyl ether monomer include 3-(2-allyloxyethoxycarbonyl)propionic acid, 3-(2-allyloxybutoxycarbonyl)propionic acid, 3-(2-vinyloxyethoxycarbonyl)propionic acid, and 3-(2-vinyloxybutoxycarbonyl)propionic acid.

Examples of the sulfonic acid group-containing monomer include vinylsulfonic acid, allylsulfonic acid, methallylsulfonic acid, styrenesulfonic acid, 2-acrylamide-2-methylpropanesulfonic acid, 2-methacryloyloxyethanesulfonic acid, 3-methacryloyloxypropanesulfonic acid, 4-methacryloyloxybutanesulfonic acid, 3-methacryloyloxy-2-hydroxypropanesulfonic acid, 3-acryloyloxypropanesulfonic acid, allyloxybenzenesulfonic acid, methallyloxybenzenesulfonic acid, isoprenesulfonic acid, and 3-allyloxy-2-hydroxypropanesulfonic acid.

The copolymer may further contain an additional copolymerizable monomer as the monomer. Examples of the additional monomer include carboxylic acid vinyl esters, alkyl vinyl ethers, and fluorine-free olefins.

The carboxylic acid vinyl ester is used for the purpose of enhancing the compatibility of the components of the chemical conversion treatment coating film or increasing the glass transition temperature of the fluororesin. Examples of the carboxylic acid vinyl ester include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl p-t-butylbenzoate.

The alkyl vinyl ether is used for the purpose of, for example, enhancing the plasticity of the chemical conversion treatment coating film. Examples of the alkyl vinyl ether include methyl vinyl ether, ethyl vinyl ether, and butyl vinyl ether.

The fluorine-free olefin is used for the purpose of, for example, enhancing the flexibility of the chemical conversion treatment coating film. Examples of the fluorine-free olefin include ethylene, propylene, n-butene, and isobutene.

For the fluororesin, a copolymer of the above monomers can be used, and alternatively a commercial product may be used. Examples of the commercial product include SIF-CLEAR F Series manufactured by JSR Corporation ("SIF-CLEAR" is a registered trademark owned by the manufacturer) and Obbligato manufactured by AGC COAT-TECH Co., Ltd. ("Obbligato" is a registered trademark owned by the manufacturer).

The base resin is also a thermoplastic resin, for example, as with the fluororesin which melts with the fluororesin in baking a chemical conversion treatment solution described later onto the plated steel sheet to constitute a part of a resin component constituting a resin coating film. The base resin is one or more selected from the group consisting of a polyurethane, a polyester, an acrylic resin, an epoxy resin, and a polyolefin. The base resin contains no fluorine atoms.

The content of the base resin in the chemical conversion treatment coating film is 10 parts by mass or more relative to 100 parts by mass of the fluororesin. When the content is less than 10 parts by mass, the adhesion of the chemical conversion treatment coating film to the plating layer and the corrosion resistance of the chemical conversion-treated steel sheet may be insufficient. The content is preferably 900 parts by mass or less and more preferably 400 parts by mass or less from the viewpoint of suppression of the change of appearance and chalking caused by a reduced retention of the metal flake each of which occurs after exposure due to the degradation of the weatherability of the chemical conversion treatment coating film.

The base resin contributes to the adhesion to the plating layer and the retention of the metal flake. From such a viewpoint, the content of the base resin in the chemical conversion treatment coating film can be appropriately determined in the range of 10 to 900 parts by mass relative to 100 parts by mass of the fluororesin.

The polyurethane is preferably a water-soluble or water-dispersible urethane resin and more preferably a self-emulsifying urethane resin from the viewpoint of easiness and safety in producing the chemical conversion treatment coating film. These have the structure of a reaction product of a reaction between an organic polyisocyanate compound and a polyol compound.

Examples of the organic polyisocyanate compound include aliphatic diisocyanates and alicyclic diisocyanates. Examples of the aliphatic diisocyanate include phenylene diisocyanate, tolylene diisocyanate, diphenylmethane diisocyanate, and naphthalene diisocyanate. Examples of the alicyclic diisocyanate include cyclohexane diisocyanate, isophorone diisocyanate, norbornane diisocyanate, xylylene diisocyanate, and tetramethylxylylene diisocyanate.

Examples of the polyol compound include polyolefin polyols. Examples of the polyolefin polyol include polyester polyols, polyether polyols, polycarbonate polyols, polyacetal polyols, polyacrylate polyols, and polybutadiene polyols.

For the polyurethane, a synthesized product from the above compounds can be used, and alternatively a commercial products may be used. Examples of the commercial product include "SUPERFLEX" manufactured by DKS Co., Ltd. (a registered trademark owned by the manufacturer) and "HYDRAN" manufactured by DIC Corporation (a registered trademark owned by the manufacturer).

For the polyester, a synthesized product can be used, and alternatively a commercial products may be used. Examples of the commercial product include "VYLONAL" (a registered trademark owned by Toyobo CO., LTD.) manufactured by TOYOBO STC CO., LTD.

For the acrylic resin, a synthesized product can be used, and alternatively a commercial products may be used. Examples of the commercial product include "PATELA-COL" manufactured by DIC Corporation (a registered trademark owned by the manufacturer), "Ultrasol" manufactured by Aica Kogyo Co., Ltd., (a registered trademark owned by the manufacturer) and "BONRON" manufactured by Mitsui Chemicals, Inc. (a registered trademark owned by the manufacturer).

For the epoxy resin, a synthesized product can be used, and alternatively a commercial products may be used. Examples of the commercial product include "MODEPICS" manufactured by Arakawa Chemical Industries, Ltd. (a registered trademark owned by the manufacturer) and "ADEKA RESIN" manufactured by ADEKA CORPORATION (a registered trademark owned by the manufacturer).

For the polyolefin, a synthesized product can be used, and alternatively a commercial products may be used. Examples of the commercial product include "ARROWBASE" manufactured by UNITIKA LTD (a registered trademark owned by the manufacturer).

The metal flake suppresses the gloss of the chemical conversion-treated steel sheet and contributes to the development of blackening resistance. From such a viewpoint, the content of the metal flake in the chemical conversion treatment coating film is 10 to 60 mass %. When the content of the metal flake is less than 10 mass %, the chemical conversion-treated steel sheet may have too high a gloss and an insufficient blackening resistance. When the content of the metal flake is more than 60 mass %, the adhesion of the chemical conversion treatment coating film to the plating layer may be insufficient.

The size of the metal flake can be appropriately determined in a range which allows the above function to be exerted. For example, the thickness of the metal flake is 0.01 to 2 μm, and the particle diameter (maximum diameter) of the metal flake is 1 to 40 μm. The size of the metal flake can be measured with a scanning electron microscope (SEM). The size value may be the average value or representative value of measurements, or the catalog value.

Examples of the metal flake include flakes made of metal and glass flakes provided with a metal plating on the surface. Examples of the metal material for the metal flake include aluminum and alloys thereof, iron and alloys thereof, copper and alloys thereof, silver, nickel, and titanium. Examples of the aluminum alloy include Al—Zn, Al—Mg, and Al—Si alloys. Examples of the iron alloy include stainless steels. Examples of the copper alloy include bronze. The metal flake is preferably one or more selected from the group consisting of an aluminum flake, an aluminum alloy flake, and a stainless steel flake from the viewpoint of, for example, corrosion resistance and high designability. The content of Mg in the metal material for the metal flake may be determined in a range which causes the metal flake to undergo substantially no blackening.

The metal flake may be surface-treated in advance with a surface treatment agent. Use of the surface-treated metal flake enables further enhancement of the water resistance and dispersiveness of the metal flake in a chemical conversion treatment solution described later in a description of the producing method. Examples of a coating film formed on the surface of the metal flake with the surface treatment agent include a molybdate coating film, a phosphate coating film, a silica coating film, and a coating film formed of a silane coupling agent and an organic resin.

Examples of the silane coupling agent include methyltriethoxysilane, methyltrimethoxysilane, dimethyldimethoxysilane, trimethylmethoxysilane, dimethyldiethoxysilane, trimethylethoxysilane, 3-aminopropyltrimethoxysilane, N-methyl-3-aminopropyltrimethoxysilane, 3-aminopropyltriethoxysilane, 3-aminopropyltris(2-methoxyethoxy)silane, N-aminoethyl-3-aminopropyltrimethoxysilane, N-aminoethyl-3-aminopropylmethyldimethoxysilane, 3-methacryloxypropyltrimethoxysilane, 3-methacryloxypropylmethyldimethoxysilane, 3-acryloxypropyltrimethoxysilane, 3-glycidyloxypropyltrimethoxysilane, 3-glycidyloxypropylmethyldimethoxysilane, 3-mercaptopropyltrimethoxysilane, 3-mercaptopropyltriethoxysilane, 3-mercaptopropylmethyldimethoxysilane, vinyltrichlorosilane, vinyltrimethoxysilane, vinyltriethoxysilane, vinyltris(2-methoxyethoxy)silane, vinyltriacetoxysilane, 3-(3,4-epoxycyclohexylethyltrimethoxy)silane, γ-aminopropyltriethoxysilane, N-β-(aminoethyl)-γ-aminopropyltrimethoxysilane, 3-ureidopropyltriethoxysilane, 3-chloropropyltrimethoxysilane, 3-anilidopropyltrimethoxysilane, 3-(4,5-dihydroimidazolepropyltriethoxy)silane, N-phenyl-3-aminopropyltrimethoxysilane, heptadecafluorodecyltrimethoxysilane, tridecafluorooctyltrimethoxysilane, trifluoropropyltrimethoxysilane, 3-isocyanatopropyltriethoxysilane, and p-styryltrimethoxysilane.

For the metal flake, a collapsed product of a metal particle can be used, and alternatively a commercial products may be used. Examples of the commercial product include WXM-U75C, EMR-D6390, WL-1100, GD-20X, and PFA4000 manufactured by TOYO ALUMINIUM K.K.

When the film thickness of the chemical conversion treatment coating film is too small, the expected functions, including the weatherability of the chemical conversion-treated steel sheet, provided by the chemical conversion treatment coating film may be insufficient; and when the film thickness is too large, the productivity may be degraded. From such a viewpoint, the film thickness is preferably 0.5 to 10 µm and more preferably 1 to 4 µm. The film thickness can be measured with a known film thickness meter, and can be adjusted in accordance with the amount of the chemical conversion treatment solution applied and the number of times of applications, as described later in a description of the producing method.

The chemical conversion treatment component is a reaction product on the surface of the plating layer, and may be in a single-component configuration or in a multiple-component configuration. Examples of the chemical conversion treatment component include 4A metal compounds, molybdates, and valve metal compounds. The compound is in a form of the above reaction product, such as a salt, an oxide, a fluoride, and a phosphate salt.

The 4A metal compound is a compound containing one or more selected from the group consisting of Ti, Zr, and Hf. The 4A metal compound contributes to enhancement of the corrosion resistance of the chemical conversion-treated steel sheet and fixation of the metal flake in the chemical conversion treatment coating film. Examples of the 4A metal compound include hydroacid salts, ammonium salts, alkali metal salts, and alkali earth metal salts of a metal containing any of these 4A metals. The content of the 4A metal in the chemical conversion treatment coating film can be measured with an X-ray fluorescence spectrometer or a high-frequency inductively coupled plasma (ICP) emission spectrometer.

The content of the 4A metal compound in the chemical conversion treatment coating film is preferably 0.005 to 5.0 mass % in terms of 4A metal atoms from the viewpoint of the above-mentioned enhancement of the weatherability and fixation of the metal flake. When the content is less than 0.005 mass %, the effect to enhance the corrosion resistance of the chemical conversion-treated steel sheet may be insufficient; and when the content is more than 5.0 mass %, the chemical conversion treatment coating film may become porous to degrade the processability and weatherability of the chemical conversion-treated steel sheet derived from the chemical conversion treatment coating film to an insufficient level.

The molybdate contributes to enhancement of the corrosion resistance of the chemical conversion-treated steel sheet. Examples of the molybdate include ammonium molybdate and alkali metal salts of molybdic acid.

The content of the molybdate in the chemical conversion treatment coating film is preferably 0.005 to 2.0 mass % in terms of molybdenum atoms from the viewpoint of the above-mentioned enhancement of the corrosion resistance. When the content is less than 0.005 mass %, the effect to enhance the corrosion resistance may be insufficient; and when the content is more than 2.0 mass %, the action to enhance the corrosion resistance becomes saturated, and in addition the stability of a treatment solution may be lowered. The content of the molybdate in the chemical conversion treatment coating film can be measured with an X-ray fluorescence spectrometer or an ICP emission spectrometer.

The valve metal compound is a compound containing one or more selected from the group consisting of V, Nb, Ta, and W. Among them, V and Nb are preferred. The valve metal compound contributes to enhancement of the corrosion resistance of the chemical conversion-treated steel sheet or suppression of an excessive gloss of the chemical conversion-treated steel sheet. Examples of the valve metal compound include oxides, hydroxides, and fluorides of the above valve metals.

The content of the valve metal compound in the chemical conversion treatment coating film is preferably 0.005 to 2.0 mass % in terms of valve metal atoms from the viewpoint of the above-mentioned enhancement of the corrosion resistance and gloss adjustment. When the content is less than 0.005 mass %, the above effect may be insufficient; and when the content is more than 2.0 mass %, the above effect may become saturated. The content of the valve metal compound in the chemical conversion treatment coating film can be measured with an X-ray fluorescence spectrometer or an ICP emission spectrometer.

The chemical conversion treatment coating film may further contain an additional component other than the fluororesin, the base resin, the metal flake, and the chemical conversion treatment component, within a range in which the effect of the present invention can be obtained. Examples of the additional component include a silane coupling agent, a phosphate salt, an etching compound, a pigment, and a wax. One of the additional components or one or more thereof may be contained.

The silane coupling agent contributes to enhancement of the adhesion of the chemical conversion treatment coating film. Examples of the silane coupling agent include silane compounds having a bondable functional group and condensates thereof. Examples of the bondable functional group include an amino group, an epoxy group, a mercapto group, an acryloxy group, a methacryloxy group, an alkoxy group, a vinyl group, a styryl group, an isocyanate group, and a chloropropyl group. One of the bondable functional group or one or more thereof may be present.

The content of the silane coupling agent in the chemical conversion treatment coating film is preferably 0.1 to 5.0 mass % from the viewpoint of the above-mentioned enhancement of the adhesion. When the content is less than 0.1 mass %, the effect to enhance the adhesion may be insufficient; and when the content is more than 5.0 mass %, the effect to enhance the adhesion may become saturated. The content of the silane coupling agent in the chemical conversion treatment coating film can be measured with an X-ray fluorescence spectrometer or an ICP emission spectrometer.

The phosphate salt contributes to enhancement of the corrosion resistance of the chemical conversion treatment coating film. The "phosphate salt" refers to a water-soluble compound having a phosphate anion. Examples of the phosphate salt include sodium phosphate, ammonium phosphate, magnesium phosphate, potassium phosphate, manganese phosphate, zinc phosphate, orthophosphates, metaphosphates, pyrophosphates (diphosphates), triphosphates, and tetraphosphates.

The content of the phosphate salt in the chemical conversion treatment coating film is preferably 0.05 to 3.0 mass % in terms of phosphorus atoms from the viewpoint of the above-mentioned enhancement of the corrosion resistance. When the content is less than 0.05 mass %, the effect to enhance the adhesion may be insufficient; and when the content is more than 3.0 mass %, the action to enhance the corrosion resistance becomes saturated, and in addition the stability of a treatment solution may be lowered. The content of the phosphate salt in the chemical conversion treatment coating film can be measured with an X-ray fluorescence spectrometer or an ICP emission spectrometer.

The etching compound is a compound, for example, containing one or more selected from the group consisting of Mg, Ca, Sr, Mn, B, Si, and Sn. The etching compound contributes to enhancement of the water resistance of the chemical conversion treatment coating film through densification of the chemical conversion treatment coating film. Examples of the etching compound include salts of the above elements.

The content of the etching compound in the chemical conversion treatment coating film is preferably 0.005 to 2.0 mass % in terms of atoms of the above element from the viewpoint of the above-mentioned enhancement of the water resistance. When the content is less than 0.005 mass %, the above effect may be insufficient; and when the content is more than 2.0 mass %, the above effect may become saturated. The content of the etching compound in the chemical conversion treatment coating film can be measured with an X-ray fluorescence spectrometer or an ICP emission spectrometer.

The pigment contributes to suppression of the gloss of the chemical conversion-treated steel sheet. One pigment or one or more pigments may be contained. The pigment may be an inorganic pigment or an organic pigment. Examples of the inorganic pigment include carbon black, silica, titania, and alumina. Examples of the organic pigment include resin particles such as an acrylic resin. Although "titania" contains titanium as a 4A metal, titania is herein classified into a pigment because of the excellent gloss-suppressing effect.

The wax contributes to the processability of the chemical conversion-treated steel sheet. From the viewpoint of developing the expected processability, the melting point of the wax is preferably 80 to 150° C. Examples of the wax include fluorine-containing waxes, polyethylene waxes, and styrene waxes.

The content of the wax in the chemical conversion treatment coating film is preferably 0.5 to 5 mass % from the viewpoint of the above-mentioned enhancement of the processability. When the content is less than 0.5 mass %, the effect to enhance the processability may be insufficient; and when the content is more than 5 mass %, the deformation of a coil of the chemical conversion-treated steel sheet as a product or collapse of piled coils in piling may occur. The content of the wax in the chemical conversion treatment coating film can be measured by using a known quantitative analysis method such as gas chromatography, high performance liquid chromatography, and mass spectrometry.

2. Method for Producing Chemical Conversion-Treated Steel Sheet

The chemical conversion-treated steel sheet can be produced by applying a chemical conversion treatment solution on the plated steel sheet and drying the applied chemical conversion treatment solution.

The chemical conversion treatment solution contains the fluororesin, the base resin, the metal flake, and a pre-chemical conversion treatment component, and may further contain the above-described additional component. The pre-chemical conversion treatment component is a precursor of the chemical conversion treatment component. The pre-chemical conversion treatment component may be the same as or different from the chemical conversion treatment component.

The content of the fluororesin relative to the total amount of the fluororesin and the base resin in the chemical conversion treatment solution is 3.0 mass % or more in terms of fluorine atoms; the content of the base resin relative to 100 parts by mass of the fluororesin in the chemical conversion treatment solution is 10 parts by mass or more; and the content of the metal flake relative to the solid content in the chemical conversion treatment solution is 10 to 60 mass %. The content of the 4A metal compound as the pre-chemical conversion treatment component relative to the solid content in the chemical conversion treatment solution is 0.005 to 5.0 mass % in terms of 4A metal atoms. The content of the additional pre-chemical conversion treatment component relative to the solid content in the chemical conversion treatment solution is 0.005 to 2.0 mass % in terms of atoms of inorganic element characteristic of the additional pre-chemical conversion treatment component. Here, the "solid content" in the chemical conversion treatment solution refers to components in the chemical conversion treatment solution which are contained in the chemical conversion treatment coating film.

The chemical conversion treatment solution may further contain a liquid medium. The liquid medium is preferably water from the viewpoint that a dispersion containing an aqueous medium as a dispersion medium, such as a resin emulsion, can be used for a raw material, and from the viewpoint of explosion resistance in producing the chemical conversion-treated steel sheet. The content of the liquid medium can be appropriately determined within a concentration range of the solid content suitable for application of the chemical conversion treatment solution.

The base resin is preferably used in an emulsion from the viewpoint of the productivity of the chemical conversion-treated steel sheet and safety in producing. The particle diameter of the emulsion of the base resin is preferably 10 to 100 nm from the viewpoint of enhancement of the water impermeability of the chemical conversion treatment coating film and enabling drying of the chemical conversion treatment solution at a lower temperature. When the particle diameter is smaller than 10 nm, the stability of the chemical conversion treatment solution may be lowered; and when the particle diameter is larger than 100 nm, the effect to enable drying of the chemical conversion treatment solution at a low temperature may be insufficient. From the same viewpoint, the fluororesin is preferably used in an emulsion, and the particle diameter of the emulsion of the fluororesin is preferably 10 to 300 nm.

The chemical conversion treatment solution may contain the materials for the chemical conversion treatment coating film as they are, or may contain precursors of the materials. A "precursor of the material" is a component which changes to the material in the chemical conversion treatment solution or changes through drying the chemical conversion treatment solution. Examples of the precursor include the pre-chemical conversion treatment component.

Examples of the pre-chemical conversion treatment component include organic salts, carbonates, and peroxide salts containing any of the above 4A metals. They are precursors of the 4A metal compounds, and can form a hydroacid salt, ammonium salt, alkali metal salt, or alkali earth metal salt containing 4A metal through drying the chemical conversion treatment solution.

Specific examples of the pre-chemical conversion treatment component include titanium salts such as $Ma_nTiF_6$ (Ma: alkali metal or alkali earth metal, n: 1 or 2), $K_2[TiO(COO)_2]$, $(NH_4)_2TiF_6$, $TiCl_4$, $TiOSO_4$, $Ti(SO_4)_2$, and $Ti(OH)_4$; zirconium salts such as $(NH_4)_2ZrF_6$, $Zr(SO_4)_2$, and $(NH_4)_2ZrO(CO_3)_2$; and molybdenum salts such as $(NH_4)_6Mo_7O_{24}$ and $K_2(MoO_2F_4)$. These are precursors of the above valve metal compounds.

In addition, the chemical conversion treatment solution may further contain an additive suitable for the chemical conversion treatment solution. Examples of the additive include a rheology-controlling agent, an etching agent, and a lubricant.

The rheology-controlling agent contributes to, for example, prevention of the settling of the metal flake in the chemical conversion treatment solution and enhancement of the dispersiveness of the metal flake in the chemical conversion treatment solution. The rheology-controlling agent is preferably one or two or more compounds selected from the group consisting of urethane compounds, acrylic compounds, polyolefins, amide compounds, anionic activating agents, nonionic activating agents, polycarboxylic acids, cellulose, metolose, and urea.

For the rheology-controlling agent, commercial products may be used. Examples of the commercial product include THIXOL K-130B and THIXOL W300 (manufactured by KYOEISHA CHEMICAL Co., LTD.); UH750 and SDX-1014 (manufactured by ADEKA CORPORATION); DISPARLON AQ-610 (manufactured by Kusumoto Chemicals, Ltd., "DISPARLON" is a registered trademark owned by the manufacturer); and BYK-425 and BYK-420 (manufactured by BYK-Chemie GmbH, "BYK" is a registered trademark owned by the manufacturer).

Examples of the etching agent include oxides and phosphates of Mg, Ca, Sr, V, W, Mn, B, Si or Sn. The etching agent is a precursor of the etching compound. The lubricant contributes to increase in lubricity of the chemical conversion treatment coating film to enhance the processability of the chemical conversion-treated steel sheet. Examples of the lubricant include inorganic lubricants such as molybdenum disulfide and talc.

The plated steel sheet may be pretreated before application of the chemical conversion treatment solution. Specifically, the producing method may further include pretreating the plated steel sheet with the phosphate compound or the valve metal before applying the chemical conversion treatment solution on the plated steel sheet. The pretreating can be carried out by applying a pretreatment solution containing the valve metal salts or the phosphate compound on the surface of the plated steel sheet followed by drying.

The pretreatment solution may further contain an additional component other than the valve metal salt. For example, the pretreatment solution may further contain an organic acid having a chelating function. The organic acid contributes to stabilization of the valve metal salt. Examples of the organic acid include tartaric acid, tannic acid, citric acid, oxalic acid, malonic acid, lactic acid, acetic acid, and ascorbic acid. The content of the organic acid in the pretreatment solution is, for example, 0.02 or more in mole ratio of the organic acid to the valve metal ion.

The pretreatment solution can be applied on the plated steel sheet by using a known method such as a roll coating method, a spin coating method, a spraying method, and a dipping method. The amount of the pretreatment solution to be applied is preferably an amount such that the amount of the valve metal to be deposited is 1 $mg/m^2$ or more. The amount of the pretreatment solution to be applied is preferably an amount such that the thickness of a pretreatment coating film to be formed is 3 to 2,000 nm or smaller. When the thickness is smaller than 3 nm, the corrosion resistance by the pretreatment coating film may be developed insufficiently; and when the thickness is larger than 1,000 nm, a crack may be generated in the pretreatment coating film due to a stress in molding processing of the plated steel sheet.

The pretreatment is carried out, for example, by drying the applied film of the pretreatment solution formed on the surface of the plated steel sheet without washing with water to form the pretreatment coating film. The applied film may be dried at normal temperature, but is preferably dried at a temperature of 50° C. or higher from the viewpoint of productivity (continuous operation). The drying temperature is preferably 200° C. or lower from the viewpoint of preventing the components in the pretreatment solution from being thermally decomposed.

The chemical conversion treatment solution can be applied on the surface of the plated steel sheet by using a known application method such as a roll coating method, a curtain flow method, a spin coating method, a spraying method, and a dipping method. The chemical conversion treatment solution applied on the surface of the plated steel sheet may be dried at normal temperature, but is preferably dried at a temperature of 50° C. or higher from the viewpoint of productivity (continuous operation). The drying temperature is preferably 300° C. or lower from the viewpoint of preventing the components in the chemical conversion treatment solution from being thermally decomposed.

The chemical conversion-treated steel sheet can be produced in accordance with the following procedure.

FIG. 1 schematically illustrates the layered structure of the chemical conversion-treated steel sheet.

Chemical conversion-treated steel sheet 10 has steel sheet 11 and chemical conversion treatment coating film 12. Plating layer 17 is disposed on the surface of steel sheet 11, and chemical conversion treatment coating film 12 is disposed on the surface of plating layer 17. Plating layer 17 is composed of, for example, a zinc alloy containing aluminum and magnesium. Chemical conversion treatment coating film 12 has a layered structure of the fluororesin and the base resin (not illustrated), and the film thickness of chemical conversion treatment coating film 12 is, for example, 1 to 4 μm. Chemical conversion treatment coating film 12 contains metal flake 13, wax 14, 4A metal compound 15, and silane coupling agent 16.

Chemical conversion treatment coating film 12 is, for example, a generally smooth layer made of a resin component produced through melting the fluororesin and the base resin. The fluororesin and the base resin serve as the matrix of chemical conversion treatment coating film 12. The content of the fluororesin relative to the total amount of the fluororesin and the base resin in chemical conversion treatment coating film 12 is 3.0 mass % or more in terms of fluorine atoms, and the mass ratio of the fluororesin to the base resin is, for example, 1:3. Chemical conversion treatment coating film 12 contains a sufficient amount of the fluororesin, which allows chemical conversion-treated steel sheet 10 to exhibit a good weatherability.

Chemical conversion treatment coating film 12 also contains a sufficient amount of the base resin, which allows chemical conversion treatment coating film 12 to have a good adhesion to plating layer 17. The content of metal flake 13 in chemical conversion treatment coating film 12 is, for example, 20 mass %. A plurality of metal flakes 13 are overlapped in the thickness direction of chemical conversion treatment coating film 12, and the distribution of metal flakes 13 in chemical conversion treatment coating film 12 is generally homogeneous when viewed in the plane direction of chemical conversion treatment coating film 12. Although a part of plating layer 17 is not covered with metal flake 13, an almost entire area of plating layer 17 is covered. This configuration moderately suppresses the gloss of chemical conversion-treated steel sheet 10. In addition, the base resin and metal flakes 13 are homogeneously distributed in the plane direction of chemical conversion treatment coating film 12, and by virtue of this configuration the change of appearance is suppressed even when the plating layer is blackened.

The reason why the blackening of the plating layer is suppressed is presumably as follows. The fluororesin and the base resin in the matrix of chemical conversion treatment coating film 12 are substantially uniform, but the boundary between the fluororesin and the base resin can serve as a pathway for liquid due to the strong liquid repellency of the fluororesin. A secretion such as perspiration from a worker entering the pathway reaches the plating layer to oxidize Mg in the plating layer, which causes the above-mentioned blackening of the plating layer.

The chemical conversion treatment coating film has metal flakes. The metal flakes are disposed in the chemical conversion treatment coating film so as to cover an almost entire area of the plating layer as described above. This configuration allows the pathway to extend while circumventing the metal flakes in the thickness direction of the chemical conversion treatment coating film, and as a result the pathway has a large length. Thus, the secretion is less likely to reach the plating layer. Even when the secretion reaches the plating layer to cause the blackening of the plating layer, the metal flakes which cover an almost entire area of the plating layer hide the blackened portion from the outside, and as a result the blackened portion is not observed from the outside. Accordingly, the change of appearance in the chemical conversion-treated steel sheet due to the blackening of the plating layer can be suppressed.

As is clear from the above description, the chemical conversion-treated steel sheet according to the present embodiment includes the chemical conversion treatment coating film disposed on the surface of the plating layer of the above hot-dip Zn—Al—Mg alloy-plated steel sheet; the chemical conversion treatment coating film contains a fluororesin, a base resin, a metal flake, and a chemical conversion treatment component; the base resin is one or more selected from the group consisting of a polyurethane, a polyester, an acrylic resin, an epoxy resin, and a polyolefin; the content of the fluororesin relative to the total amount of the fluororesin and the base resin is 3.0 mass % or more in terms of fluorine atoms; the content of the base resin relative to 100 parts by mass of the fluororesin in the chemical conversion treatment coating film is 10 parts by mass or more; and the content of the metal flake in the chemical conversion treatment coating film is more than 20 mass % and 60 mass % or less. This configuration allows the chemical conversion-treated steel sheet to have weatherability and exhibit suppressed gloss and suppressed discoloration over time.

The configuration in which the metal flake is one or more selected from the group consisting of an aluminum flake, an aluminum alloy flake, and a stainless steel flake, is even more effective from the viewpoint of corrosion resistance and high designability.

The configuration in which the film thickness of the chemical conversion treatment coating film is 0.5 to 10 μm, is even more effective from the viewpoint of allowing the chemical conversion treatment coating film to exert the expected function and enhancement of the productivity.

The configuration in which the content of the base resin relative to 100 parts by mass of the fluororesin in the chemical conversion treatment coating film is 900 parts by mass or less, is even more effective from the viewpoint of the weatherability of the chemical conversion treatment coating film.

The configuration in which the chemical conversion treatment component contains a 4A metal compound including one or more selected from the group consisting of Ti, Zr, and Hf, and the content of the 4A metal compound based on the chemical conversion treatment coating film is 0.005 to 5.0 mass % in terms of 4A metal, is even more effective from the viewpoint of enhancement of the corrosion resistance of the chemical conversion-treated steel sheet, fixation of the metal flake in the chemical conversion treatment coating film, and the processability of the chemical conversion treatment coating film.

The configuration in which the chemical conversion treatment component contains one or both of a molybdate and a valve metal compound and the valve metal compound is a compound including one or both of V and Nb, is even more effective from the viewpoint of enhancement of the corrosion resistance of the chemical conversion-treated steel sheet, gloss adjustment, or enhancement of the water resistance.

The configuration in which the chemical conversion treatment coating film further contains one or both of a silane coupling agent and a phosphate salt, is even more effective from the viewpoint of enhancement of the corrosion resistance of the chemical conversion-treated steel sheet.

The configuration in which the plated steel sheet has been pretreated with a phosphate compound or a valve metal component, is even more effective from the viewpoint of suppression of the gloss of the chemical conversion-treated steel sheet and enhancement of the corrosion resistance.

The configuration in which the chemical conversion treatment coating film further contains a pigment, is even more effective from the viewpoint of suppression of the gloss of the chemical conversion-treated steel sheet.

The configuration in which the chemical conversion treatment coating film further contains a wax, is even more effective from the viewpoint of enhancement of the processability of the chemical conversion-treated steel sheet.

The method for producing a chemical conversion-treated steel sheet includes: applying a chemical conversion treatment solution on the plating layer; and drying the applied chemical conversion treatment solution to produce a chemical conversion-treated steel sheet, in which the chemical conversion treatment solution contains a fluororesin, a base resin, a metal flake, and a pre-chemical conversion treatment component, the base resin is one or more selected from the group consisting of a polyurethane, a polyester, an acrylic resin, an epoxy resin, and a polyolefin, the content of the fluororesin relative to the total amount of the fluororesin and the base resin in the chemical conversion treatment solution is 3.0 mass % or more in terms of fluorine atoms, the content of the base resin relative to 100 parts by mass of the fluororesin in the chemical conversion treatment solution is 10 parts by mass or more, and the content of the metal flake relative to the solid content in the chemical conversion treatment solution is more than 20 mass % and 60 mass % or less. This configuration can provide a chemical conversion-treated steel sheet which has weatherability and exhibits suppressed gloss and suppressed discoloration over time.

The configuration in which the chemical conversion treatment solution contains an emulsion of the fluororesin and an emulsion of the base resin, the particle diameter of the emulsion of the fluororesin is 10 to 300 nm, and the particle diameter of the emulsion of the base resin is 10 to 100 nm, is even more effective from the viewpoint of enhancement of the water impermeability of the chemical conversion treatment coating film and enabling drying of the chemical conversion treatment solution at a lower temperature.

The configuration in which the producing method further includes pretreating the plated steel sheet with a phosphate compound or the valve metal component before application of the chemical conversion treatment solution, is even more effective from the viewpoint of suppression of the gloss of the chemical conversion-treated steel sheet and enhancement of the corrosion resistance.

The chemical conversion treatment solution contains a fluororesin, a base resin, a metal flake, and a pre-chemical conversion treatment component; the base resin is one or more selected from the group consisting of a polyurethane, a polyester, an acrylic resin, an epoxy resin, and a polyolefin; the content of the fluororesin relative to the total amount of the fluororesin and the base resin in the chemical conversion treatment solution is 3.0 mass % or more in terms of fluorine atoms; the content of the base resin relative to 100 parts by mass of the fluororesin in the chemical conversion treatment solution is 10 parts by mass or more; and the content of the metal flake relative to the solid content in the chemical conversion treatment solution is more than 20 mass % and 60 mass % or less. By virtue of this configuration, application of the chemical conversion treatment solution on a plated steel sheet followed by drying can provide a chemical conversion-treated steel sheet which has weatherability and exhibits suppressed gloss and suppressed discoloration over time.

The chemical conversion-treated steel sheet is excellent in weatherability with an excessive gloss suppressed, and thus is also excellent in designability. Accordingly, the chemical conversion-treated steel sheet is suitable for exterior building materials. In addition, the chemical conversion-treated steel sheet has an excellent effect to prevent discoloration over time, and further can prevent blackening due to other factors, such as blackening due to the attachment of perspiration from, for example, a worker handling an exterior building material. Thus, the chemical conversion-treated steel sheet keeps the beautiful appearance, and is also effective for enhancement of workability in exterior finishing with an exterior building material using the chemical conversion-treated steel sheet.

Hereinafter, the present invention will be described in detail with reference to Examples, but the present invention is never limited to these Examples.

EXAMPLES

[Production of Al-Containing Zn Alloy-Plated Steel Sheet]

Using an SPCC having a sheet thickness of 0.8 mm as a base material, a hot-dip Zn-6 mass % Al-3 mass % Mg alloy-plated steel sheet (hereinafter, also referred to as "plated steel sheet A") was produced. The amount of plating deposition of plated steel sheet A was 45 $g/m^2$.

[Preparation of Chemical Conversion Treatment Solution]
(Preparation of Materials)
The following materials were prepared.
(1) Resin Emulsion
An "fluororesin emulsion" is an aqueous emulsion of a fluororesin (Tg: −35 to 25° C., minimum film-forming temperature (MFT): 10° C., FR), the concentration of the solid content of the fluororesin emulsion is 40 mass %, the fluorine atom content in the fluororesin is 25 mass %, and the average particle diameter of the emulsion is 150 nm.

For an emulsion of a urethane resin (PU), a "HYDRAN" manufactured by DIC Corporation was prepared. The concentration of the solid content of the "HYDRAN" is 35 mass %. The average particle diameter of the emulsion is estimated to be approximately 10 to 100 nm.

For an emulsion of an acrylic resin (AR), a "PATELACOL" manufactured by DIC Corporation (a registered trademark owned by the manufacturer) was prepared. The concentration of the solid content of the "PATELACOL" is 40 mass %. The average particle diameter of the emulsion is estimated to be approximately 10 to 100 nm.

For an emulsion of a polyester (PE), a "VYLONAL" manufactured by TOYOBO STC CO., LTD. was prepared. The concentration of the solid content of the "VYLONAL" is 30 mass %. The average particle diameter of the emulsion is estimated to be approximately 10 to 100 nm.

For an emulsion of an epoxy resin (ER), an "ADEKA RESIN" manufactured by ADEKA CORPORATION was prepared (a registered trademark owned by the manufacturer). The concentration of the solid content of the "ADEKA RESIN" is 30 mass %. The average particle diameter of the emulsion is estimated to be approximately 10 to 100 nm.

For an emulsion of a polyolefin (PO), an "ARROWBASE" manufactured by UNITIKA LTD. (a registered trademark owned by the manufacturer) was prepared. The concentration of the solid content of the "ARROWBASE" is 25 mass %. The average particle diameter of the emulsion is estimated to be approximately 10 to 100 nm.

(2) Metal Flake
For an aluminum flake, a "WXM-U75C" manufactured by TOYO ALUMINIUM K.K. was prepared. The average particle diameter and average thickness of the aluminum flake are 18 μm and 0.2 μm, respectively.

For a stainless steel flake, a "PFA4000" manufactured by TOYO ALUMINIUM K.K. was prepared. The average particle diameter and average thickness of the stainless steel flake are 40 μm and 0.5 μm, respectively.

(3) Pre-Chemical Conversion Treatment Component

For a titanium compound (Ti), "$H_2TiF_6$ (40% aqueous solution)" was prepared. The Ti atom content in $H_2TiF_6$ (40%) is 11.68 mass %.

For a zirconium compound (Zr), "Zircosol AC-7" manufactured by DAIICHI KIGENSO KAGAKU KOGYO CO., LTD. was prepared. The Zr atom content in the Zircosol AC-7 is 9.62 mass %. "Zircosol" is registered trademark owned by the manufacturer.

For a vanadium compound (V), ammonium metavanadate ($NH_4VO_3$) was prepared. The V atom content in ammonium metavanadate is 43.55 mass %.

For a molybdate compound (Mo), ammonium molybdate (($NH_4)_6Mo_7O_{24}\cdot 4H_2O$) was prepared. The Mo atom content in ammonium molybdate is 54.35 mass %.

(4) Additives

For a wax, a "Hitech" manufactured by TOHO Chemical Industry Co., Ltd. was prepared. The melting point of the wax is 120° C.

For a rheology-controlling agent (RCA), a "BYK-420" manufactured by BYK-Chemie GmbH was prepared. "BYK" is a registered trademark owned by the manufacturer.

For pigment A (silica), a "LIGHTSTAR" manufactured by NISSAN CHEMICAL INDUSTRIES, LTD. was prepared. The average particle diameter of the "LIGHTSTAR" is 200 nm.

For pigment B (carbon black), a "Ketjenblack" manufactured by Lion Corporation was prepared. The average particle diameter of the "Ketjenblack" is 40 nm.

For pigment C (organic pigment), a "Styrene-acrylic resin" manufactured by NIPPONPAINT Co., Ltd. was prepared. The average particle diameter of the "Styrene-acrylic resin" is 500 nm.

For a phosphate compound, diammonium hydrogenphosphate (($NH_4)_2HPO_4$)) was prepared. The P atom content in diammonium hydrogenphosphate is 23.44 mass %.

For a silane coupling agent (SCA), a "SILQUEST A-186" manufactured by Momentive Performance Materials Japan LLC. was prepared.

Example 1

Preparation of Chemical Conversion Treatment Solution 1

The fluororesin emulsion, the urethane resin emulsion, the aluminum flake, the titanium compound, and water each in an appropriate amount were mixed together to obtain chemical conversion treatment solution 1. The content of the urethane resin relative to 100 parts by mass of the fluororesin in chemical conversion treatment solution 1 was 10 parts by mass. The content of the resins other than the fluororesin (also referred to as "base material content") relative to 100 parts by mass of the fluororesin in chemical conversion treatment solution 1 was 10 parts by mass. The fluorine atom content (also referred to as "F content") in the whole organic resin (the total amount of the fluororesin and the base resin) in chemical conversion treatment solution 1 was 22.7 mass %. The content of the metal flake (also referred to as "flake content") relative to the solid content in chemical conversion treatment solution 1 was 25 mass %. The content of the titanium compound relative to the solid content in chemical conversion treatment solution 1 was 0.05 mass % in terms of Ti atoms.

Example 2

Preparation of Chemical Conversion Treatment Solution 2

The fluororesin emulsion, the polyester emulsion, the aluminum flake, the titanium compound, the phosphate compound, and water each in an appropriate amount were mixed together to obtain chemical conversion treatment solution 2. The content of the polyester relative to 100 parts by mass of the fluororesin in chemical conversion treatment solution 2 was 100 parts by mass, the content of the titanium compound relative to the solid content in chemical conversion treatment solution 2 was 0.20 mass % in terms of metal Ti, and the content of the phosphate compound relative to the solid content in chemical conversion treatment solution 2 was 0.6 mass % in terms of P. The base material content in chemical conversion treatment solution 2 was 100 parts by mass. The fluorine atom content of chemical conversion treatment solution 2 was 12.5 mass %. The flake content in chemical conversion treatment solution 2 was 40 mass %.

Example 3

Preparation of Chemical Conversion Treatment Solution 3

Chemical conversion treatment solution 3 was obtained in the same manner as in the case of chemical conversion treatment solution 2 except that the phosphate compound was not added, the zirconium compound was added in place of the titanium compound, the amount of the aluminum flake to be added was changed, and the rheology-controlling agent was added. The base material content in chemical conversion treatment solution 3 was 100 parts by mass. The fluorine atom content in chemical conversion treatment solution 3 was 12.5 mass %. The flake content in chemical conversion treatment solution 3 was 60 mass %, and the content of the rheology-controlling agent was 0.5 mass %.

Example 4

Preparation of Chemical Conversion Treatment Solution 4

Chemical conversion treatment solution 4 was obtained in the same manner as in the case of chemical conversion treatment solution 3 except that the amount of the aluminum flake to be added was changed, the vanadium compound was added in place of the zirconium compound, and pigment C was added. The base material content in chemical conversion treatment solution 4 was 100 parts by mass. The fluorine atom content in chemical conversion treatment solution 4 was 12.5 mass %. The flake content in chemical conversion treatment solution 4 was 30 mass %. The content of pigment C relative to the solid content in chemical conversion treatment solution 4 was 0.5 mass %.

Example 5

Preparation of Chemical Conversion Treatment Solution 5

The fluororesin emulsion, the urethane resin emulsion, the acrylic resin emulsion, the polyester emulsion, the polyolefin emulsion, the aluminum flake, the titanium compound, the wax, and water each in an appropriate amount were mixed together to obtain chemical conversion treatment solution 5. The content of the urethane resin relative to 100 parts by mass of the fluororesin in chemical conversion treatment solution 5 was 100 parts by mass, the contents of the acrylic resin, the polyester, and the polyolefin relative to 100 parts by mass of the fluororesin in chemical conversion treatment solution 5 were each 25 parts by mass, and the content of the wax relative to the solid content in chemical conversion treatment solution 5 was 2.0 mass %. The base material content in chemical conversion treatment solution 5 was 175 parts by mass. The fluorine atom content in chemical conversion treatment solution 5 was 9.1 mass %. The flake content in chemical conversion treatment solution 5 was 30 mass %. The content of the titanium compound relative to the solid content in chemical conversion treatment solution 5 was 0.05 mass % in terms of Ti atoms.

Example 6

Preparation of Chemical Conversion Treatment Solution 6

The fluororesin emulsion, the urethane resin emulsion, the acrylic resin emulsion, the polyester emulsion, the epoxy resin emulsion, the polyolefin emulsion, the aluminum flake, the wax, the zirconium compound, and water each in an appropriate amount were mixed together to obtain chemical conversion treatment solution 6. The content of the urethane resin relative to 100 parts by mass of the fluororesin in chemical conversion treatment solution 6 was 300 parts by mass, the contents of the acrylic resin, the polyester, and the epoxy resin relative to 100 parts by mass of the fluororesin in chemical conversion treatment solution 6 were each 100 parts by mass, and the content of the polyolefin was 50 parts by mass. The content of the wax relative to the solid content in chemical conversion treatment solution 6 was 2.0 mass %, and the content of the zirconium compound relative to the solid content in chemical conversion treatment solution 6 was 0.20 mass % in terms of Zr atoms. The base material content in chemical conversion treatment solution 6 was 650 parts by mass. The fluorine atom content in chemical conversion treatment solution 6 was 3.3 mass %. The flake content in chemical conversion treatment solution 6 was 25 mass %.

Example 7

Preparation of Chemical Conversion Treatment Solution 7

The fluororesin emulsion, the urethane resin emulsion, the acrylic resin emulsion, the aluminum flake, the wax, the zirconium compound, the phosphate compound, the silane coupling agent, the rheology-controlling agent, and water each in an appropriate amount were mixed together to obtain chemical conversion treatment solution 7. The contents of the urethane resin and the acrylic resin relative to 100 parts by mass of the fluororesin in chemical conversion treatment solution 7 were each 150 parts by mass, the content of the wax relative to the solid content in chemical conversion treatment solution 7 was 2.5 mass %, the content of the zirconium compound relative to the solid content in chemical conversion treatment solution 7 was 1.00 mass % in terms of Zr atoms, the content of the phosphate compound relative to the solid content in chemical conversion treatment solution 7 was 0.6 mass % in terms of P, the content of the silane coupling agent relative to the solid content in chemical conversion treatment solution 7 was 1.5 mass %, and the content of the rheology-controlling agent was 0.5 mass %. The base material content in chemical conversion treatment solution 7 was 300 parts by mass. The fluorine atom content in chemical conversion treatment solution 7 was 6.3 mass %. The flake content in chemical conversion treatment solution 7 was 30 mass %.

Example 8

Preparation of Chemical Conversion Treatment Solution 8

The fluororesin emulsion, the urethane resin emulsion, the polyester emulsion, the epoxy resin emulsion, the polyolefin emulsion, the aluminum flake, the titanium compound, the phosphate compound, the silane coupling agent, and water each in an appropriate amount were mixed together to obtain chemical conversion treatment solution 8. The contents of the urethane resin, the polyester, the epoxy resin, and the polyolefin relative to 100 parts by mass of the fluororesin in chemical conversion treatment solution 8 were each 25 parts by mass, the content of the titanium compound relative to the solid content in chemical conversion treatment solution 8 was 0.20 mass % in terms of Ti atoms, the content of the phosphate compound relative to the solid content in chemical conversion treatment solution 8 was 0.6 mass % in terms of P, and the content of the silane coupling agent relative to the solid content in chemical conversion treatment solution 8 was 1.5 mass %. The base material content in chemical conversion treatment solution 8 was 100 parts by mass. The fluorine atom content in chemical conversion treatment solution 8 was 12.5 mass %. The flake content in chemical conversion treatment solution 8 was 30 mass %.

Example 9

Preparation of Chemical Conversion Treatment Solution 9

The fluororesin emulsion, the urethane resin emulsion, the acrylic resin emulsion, the polyester emulsion, the polyolefin emulsion, the stainless steel flake, the zirconium compound, and water each in an appropriate amount were mixed together to obtain chemical conversion treatment solution 9. The content of the urethane resin relative to 100 parts by mass of the fluororesin in chemical conversion treatment solution 9 was 50 parts by mass, the contents of the acrylic resin, the polyester, and the polyolefin relative to 100 parts by mass of the fluororesin in chemical conversion treatment solution 9 were each 25 parts by mass, and the content of the zirconium compound relative to the solid content in chemical conversion treatment solution 9 was 0.50 mass % in terms of Zr atoms. The base material content in chemical conversion treatment solution 9 was 125 parts by mass. The fluorine atom content in chemical conversion treatment solution 9 was 11.1 mass %. The flake content in chemical conversion treatment solution 9 was 30 mass %.

Example 10

Preparation of Chemical Conversion Treatment Solution 10

Chemical conversion treatment solution 10 was obtained in the same manner as in the case of chemical conversion treatment solution 9 except that an appropriate amount of the aluminum flake was used in place of the stainless steel flake, the amount of the zirconium compound to be added was changed, and an appropriate amount of pigment A (silica) was used. The content of pigment A relative to the solid content in chemical conversion treatment solution 10 was 0.5 mass % The base material content in chemical conversion treatment solution 10 was 125 parts by mass. The fluorine atom content in chemical conversion treatment solution 10 was 11.1 mass %. The flake content in chemical conversion treatment solution 10 was 21 mass %. The content of the zirconium compound relative to the solid content in chemical conversion treatment solution 10 was 0.20 mass % in terms of Zr atoms.

Example 11

Preparation of Chemical Conversion Treatment Solution 11

Chemical conversion treatment solution 11 was obtained in the same manner as in the case of chemical conversion treatment solution 10 except that the amounts of the urethane resin emulsion and the aluminum flake to be added were changed, the titanium compound was used in place of the zirconium compound, and pigment B (carbon black) was used in place of pigment A in appropriate amounts, respectively. The content of the urethane resin relative to 100 parts by mass of the fluororesin in chemical conversion treatment solution 11 was 20 parts by mass, and the content of pigment B relative to the solid content in chemical conversion treatment solution 11 was 0.2 mass %. The base material content in chemical conversion treatment solution 11 was 95 parts by mass. The fluorine atom content in chemical conversion treatment solution 11 was 12.8 mass %. The flake content in chemical conversion treatment solution 11 was 25 mass %.

Example 12

Preparation of Chemical Conversion Treatment Solution 12

The fluororesin emulsion, the urethane resin emulsion, the acrylic resin emulsion, the polyester emulsion, the epoxy resin emulsion, the aluminum flake, the stainless steel flake, the molybdate compound, pigment C (organic pigment), and water each in an appropriate amount were mixed together to obtain chemical conversion treatment solution 12. The content of the urethane resin relative to 100 parts by mass of the fluororesin in chemical conversion treatment solution 12 was 50 parts by mass, the contents of the acrylic resin, the polyester, and the epoxy resin relative to 100 parts by mass of the fluororesin in chemical conversion treatment solution 12 were each 25 parts by mass, the content of the molybdate compound relative to the solid content in chemical conversion treatment solution 12 was 0.01 mass % in terms of Mo atoms, and the content of pigment C relative to the solid content in chemical conversion treatment solution 12 was 0.5 mass %. The base material content in chemical conversion treatment solution 12 was 125 parts by mass. The fluorine atom content in chemical conversion treatment solution 12 was 11.1 mass %. The flake content in chemical conversion treatment solution 12 was 50 mass %. The content of the aluminum flake was 30 mass % and the content of the stainless steel flake was 20 mass %.

Example 13

Preparation of Chemical Conversion Treatment Solution 13

Chemical conversion treatment solution 13 was obtained in the same manner as in the case of chemical conversion treatment solution 12 except that the polyolefin emulsion was used in place of the acrylic resin emulsion, the amount of the stainless steel flake to be added was changed, the amount of the molybdate compound to be added was changed, and an appropriate amount of the wax was used as an additive. The content of the urethane resin relative to 100 parts by mass of the fluororesin in chemical conversion treatment solution 13 was 50 parts by mass, the contents of the polyester, the epoxy resin, and the polyolefin relative to 100 parts by mass of the fluororesin in chemical conversion treatment solution 13 were each 25 parts by mass, and the content of the wax relative to the solid content in chemical conversion treatment solution 13 was 2.0 mass %. The base material content in chemical conversion treatment solution 13 was 125 parts by mass. The fluorine atom content in chemical conversion treatment solution 13 was 11.1 mass %. The flake content in chemical conversion treatment solution 13 was 35 mass %. The content of the aluminum flake was 30 mass % and the content of the stainless steel flake was 5 mass %. The content of the molybdate compound relative to the solid content in chemical conversion treatment solution 13 was 2.00 mass % in terms of Mo atoms.

Example 14

Preparation of Chemical Conversion Treatment Solution 14

Chemical conversion treatment solution 14 was obtained in the same manner as in the case of chemical conversion treatment solution 9 except that the aluminum flake was used in place of the stainless steel flake, an appropriate amount of the vanadium compound was used in place of the zirconium compound, and an appropriate amount of the silane coupling agent was used. The content of the silane coupling agent relative to the solid content in chemical conversion treatment solution 14 was 1.5 mass %. The base material content in chemical conversion treatment solution 14 was 125 parts by mass. The fluorine atom content in chemical conversion treatment solution 14 was 11.1 mass %. The flake content in chemical conversion treatment solution 14 was 30 mass %. The content of the vanadium compound relative to the solid content in chemical conversion treatment solution 14 was 3.00 mass % in terms of V atoms.

Example 15

Preparation of Chemical Conversion Treatment Solution 15

The fluororesin emulsion, the urethane resin emulsion, the acrylic resin emulsion, the polyester emulsion, the epoxy resin emulsion, the polyolefin emulsion, the aluminum flake, the titanium compound, pigment A, pigment C, and water each in an appropriate amount were mixed together to obtain chemical conversion treatment solution 15. The content of the urethane resin relative to 100 parts by mass of the fluororesin in chemical conversion treatment solution 15 was 50 parts by mass, the contents of the acrylic resin and the polyester relative to 100 parts by mass of the fluororesin in chemical conversion treatment solution 15 were each 25 parts by mass, the content of the epoxy resin relative to 100 parts by mass of the fluororesin in chemical conversion treatment solution 15 was 10 parts by mass, the content of the polyolefin relative to 100 parts by mass of the fluororesin in chemical conversion treatment solution 15 was 15 parts by mass, and the contents of pigment A and pigment C relative to the solid content in chemical conversion treatment solution 15 were each 0.5 mass %. The base material content in chemical conversion treatment solution 15 was 125 parts by mass. The fluorine atom content in chemical conversion treatment solution 15 was 11.1 mass %. The flake content in chemical conversion treatment solution 15 was 25 mass %. The content of the titanium compound relative to the solid content in chemical conversion treatment solution 15 was 0.20 mass % in terms of Ti atoms.

Example 16

Preparation of Chemical Conversion Treatment Solution 16

Chemical conversion treatment solution 16 was obtained in the same manner as in the case of chemical conversion treatment solution 10 except that the amount of the aluminum flake to be added was changed, the amount of the zirconium compound to be added was changed, and pigment A was not added. The base material content in chemical conversion treatment solution 16 was 125 parts by mass. The fluorine atom content in chemical conversion treatment solution 16 was 11.1 mass %. The flake content in chemical conversion treatment solution 16 was 25 mass %. The content of the zirconium compound relative to the solid content in chemical conversion treatment solution 16 was 0.50 mass % in terms of Zr atoms.

Comparative Example 1

Preparation of Chemical Conversion Treatment Solution 17

Chemical conversion treatment solution 17 was obtained in the same manner as in the case of chemical conversion treatment solution 4 except that the titanium compound was used in place of the vanadium compound, and the polyester emulsion and pigment C were not added. The base material content in chemical conversion treatment solution 17 was 0 parts by mass. The fluorine atom content in chemical conversion treatment solution 17 was 25.0 mass %. The flake content in chemical conversion treatment solution 17 was 30 mass %.

Comparative Example 2

Preparation of Chemical Conversion Treatment Solution 18

The urethane resin emulsion, the polyester emulsion, the polyolefin emulsion, the aluminum flake, the zirconium compound, and water each in an appropriate amount were mixed together to obtain chemical conversion treatment solution 18. The contents of the polyester and the polyolefin relative to 50 parts by mass of the urethane resin in chemical conversion treatment solution 18 were each 25 parts by mass. The base material content in chemical conversion treatment solution 18 was 100 parts by mass. The fluorine atom content in chemical conversion treatment solution 18 was 0 mass %. The flake content in chemical conversion treatment solution 18 was 30 mass %. The content of the zirconium compound relative to the solid content in chemical conversion treatment solution 18 was 0.20 mass % in terms of Zr atoms.

Comparative Example 3

Preparation of Chemical Conversion Treatment Solution 19

The acrylic resin emulsion, the polyester emulsion, the epoxy resin emulsion, the polyolefin emulsion, the aluminum flake, the vanadium compound and, water each in an appropriate amount were mixed together to obtain chemical conversion treatment solution 19. The contents of the polyester, the epoxy resin, and the polyolefin relative to 25 parts by mass of the acrylic resin in chemical conversion treatment solution 19 were each 25 parts by mass. The base material content in chemical conversion treatment solution 19 was 100 parts by mass. The fluorine atom content in chemical conversion treatment solution 19 was 0 mass %. The flake content in chemical conversion treatment solution 19 was 30 mass %. The content of the vanadium compound relative to the solid content in chemical conversion treatment solution 19 was 0.20 mass % in terms of V atoms.

Comparative Example 4

Preparation of Chemical Conversion Treatment Solution 20

Chemical conversion treatment solution 20 was obtained in the same manner as in the case of chemical conversion treatment solution 16 except that an appropriate amount of the titanium compound was used in place of the zirconium compound, and the amount of the aluminum flake to be added was changed. The base material content in chemical conversion treatment solution 20 was 125 parts by mass. The fluorine atom content in chemical conversion treatment solution 20 was 11.1 mass %. The flake content in chemical conversion treatment solution 20 was 5 mass %. The content of the titanium compound relative to the solid content in chemical conversion treatment solution 20 was 0.20 mass % in terms of Ti atoms.

Comparative Example 5

Preparation of Chemical Conversion Treatment Solution 21

Chemical conversion treatment solution 21 was obtained in the same manner as in the case of chemical conversion treatment solution 16 except that the amount of the zirconium compound to be added and the amount of the aluminum flake to be added were changed. The base material content in chemical conversion treatment solution 21 was 125 parts by mass. The fluorine atom content in chemical conversion treatment solution 21 was 11.1 mass %. The flake content in chemical conversion treatment solution 21 was 65 mass %. The content of the zirconium compound relative to the solid content in chemical conversion treatment solution 21 was 0.20 mass % in terms of Zr atoms.

The compositions of chemical conversion treatment solutions 1 to 16 are listed in Table 1. The compositions of chemical conversion treatment solutions 17 to 21 are listed in Table 2.

TABLE 1

| Chemical conversion treatment solution No. | Organic resin Content (part by mass) | | | | | | | F content (%) | Metal flake Content (mass %) | | | Chemical conversion treatment component | | Additive | | Classification |
|---|---|---|---|---|---|---|---|---|---|---|---|---|---|---|---|---|
| | FR (A) | PU (B) | AR (C) | PE (D) | ER (E) | PO (F) | Total of B to F | | Al (a) | SUS (b) | Total of a and b | Element | Content (mass %) | Inorganic | Organic | |
| 1 | 100 | 10 | 0 | 0 | 0 | 0 | 10 | 22.7 | 25 | 0 | 25 | Ti | 0.05 | — | — | Example |
| 2 | 100 | 0 | 0 | 100 | 0 | 0 | 100 | 12.5 | 40 | 0 | 40 | Ti | 0.20 | P | — | |
| 3 | 100 | 0 | 0 | 100 | 0 | 0 | 100 | 12.5 | 60 | 0 | 60 | Zr | 0.20 | — | RCA | |
| 4 | 100 | 0 | 0 | 100 | 0 | 0 | 100 | 12.5 | 30 | 0 | 30 | V | 0.20 | — | Pigment C RCA | |
| 5 | 100 | 100 | 25 | 25 | 0 | 25 | 175 | 9.1 | 30 | 0 | 30 | Ti | 0.05 | — | wax | |
| 6 | 100 | 300 | 100 | 100 | 100 | 50 | 650 | 3.3 | 25 | 0 | 25 | Zr | 0.20 | — | wax | |
| 7 | 100 | 150 | 150 | 0 | 0 | 0 | 300 | 6.3 | 30 | 0 | 30 | Zr | 1.00 | P, SCA | wax RCA | |
| 8 | 100 | 25 | 0 | 25 | 25 | 25 | 100 | 12.5 | 30 | 0 | 30 | Ti | 0.20 | P, SCA | — | |
| 9 | 100 | 50 | 25 | 25 | 0 | 25 | 125 | 11.1 | 0 | 30 | 30 | Zr | 0.50 | — | — | |
| 10 | 100 | 50 | 25 | 25 | 0 | 25 | 125 | 11.1 | 21 | 0 | 21 | Zr | 0.20 | $SiO_2$ | — | |
| 11 | 100 | 20 | 25 | 25 | 0 | 25 | 95 | 12.8 | 25 | 0 | 25 | Ti | 0.20 | CB | — | |
| 12 | 100 | 50 | 25 | 25 | 25 | 0 | 125 | 11.1 | 30 | 20 | 50 | Mo | 0.01 | — | Pigment C | |
| 13 | 100 | 50 | 0 | 25 | 25 | 25 | 125 | 11.1 | 30 | 5 | 35 | Mo | 2.00 | — | wax | |
| 14 | 100 | 50 | 25 | 25 | 0 | 25 | 125 | 11.1 | 30 | 0 | 30 | V | 3.00 | SCA | — | |
| 15 | 100 | 50 | 25 | 25 | 10 | 15 | 125 | 11.1 | 25 | 0 | 25 | Ti | 0.20 | $SiO_2$ | Pigment C | |
| 16 | 100 | 50 | 25 | 25 | 0 | 25 | 125 | 11.1 | 25 | 0 | 25 | Zr | 0.50 | — | — | |

TABLE 2

| Chemical conversion treatment solution No. | Organic resin Content (part by mass) | | | | | | | F content (%) | Metal flake Content (mass %) | | | Chemical conversion treatment | | Additive | Classification |
|---|---|---|---|---|---|---|---|---|---|---|---|---|---|---|---|
| | FR (A) | PU (B) | AR (C) | PE (D) | ER (E) | PO (F) | Total of B to F | | Al (a) | SUS (b) | Total of a and b | Element | Content (mass %) | | |
| 17 | 100 | 0 | 0 | 0 | 0 | 0 | 0 | 25.0 | 30 | 0 | 30 | Ti | 0.20 | RCA | Comparative Example |
| 18 | 0 | 50 | 0 | 25 | 0 | 25 | 100 | 0 | 30 | 0 | 30 | Zr | 0.20 | — | |
| 19 | 0 | 0 | 25 | 25 | 25 | 25 | 100 | 0 | 30 | 0 | 30 | V | 0.20 | — | |
| 20 | 100 | 50 | 25 | 25 | 0 | 25 | 125 | 11.1 | 5 | 0 | 5 | Ti | 0.20 | — | |
| 21 | 100 | 50 | 25 | 25 | 0 | 25 | 125 | 11.1 | 65 | 0 | 65 | Zr | 0.20 | — | |

Example 17

Chemical conversion treatment solution 1 was applied on plated steel sheet A, and heat-dried to a temperature of plated steel sheet A of 140° C. to form a chemical conversion treatment coating film having a film thickness of 2.0 μm. Thus was obtained chemical conversion-treated steel sheet 1 having the base material, the fluorine atom, the flake, and the titanium compound with the same contents as those of chemical conversion treatment solution 1.

Examples 18 to 36

Chemical conversion-treated steel sheets 2 to 20 were obtained in the same manner as in the case of chemical conversion-treated steel sheet 1 except that the type, the drying temperature, and the film thickness of a chemical conversion treatment solution were changed as shown in Table 3 below. Each of chemical conversion-treated steel sheets 2 to 20 had the base material, the fluorine atom, the flake, and the chemical conversion treatment component, etc. with the same contents as that of the corresponding chemical conversion treatment solution among chemical conversion treatment solutions 2 to 16.

Example 37

Chemical conversion-treated steel sheet 21 was obtained in the same manner as in the case of chemical conversion-treated steel sheet 1 except that plated steel sheet A pretreated with a phosphate salt was used, and the type and the film thickness of a chemical conversion treatment solution were changed as shown in Table 3 below. Chemical conversion-treated steel sheet 21 had the base material, the fluorine atom, the flake, the chemical conversion treatment component with the same contents as that of chemical conversion treatment solution 16.

For the pretreatment with a phosphate salt, the plated steel sheet was immersed for 3 seconds in a treatment solution having a phosphate ion concentration of 0.1 mol/L and an Mn ion concentration of 0.1 mol/L with the solution temperature adjusted to 60° C.

Example 38

Chemical conversion-treated steel sheet 22 was obtained in the same manner as in the case of chemical conversion-treated steel sheet 1 except that plated steel sheet A pretreated with a valve metal was used, and the type and the film thickness of a chemical conversion treatment solution were changed as shown in Table 3 below. Chemical conversion-treated steel sheet 22 had the base material, the fluorine atom, the flake, and the chemical conversion treatment component with the same contents as that of chemical conversion treatment solution 16.

For the pretreatment with a valve metal, an aqueous solution of $H_2TiF_6$ (40%) having a concentration of 5 g/L in terms of metal Ti was applied on the plated steel sheet through spray ringer process.

Examples 39 and 40

Chemical conversion-treated steel sheets 23 and 24 were obtained in the same manner as in the cases of chemical conversion-treated steel sheets 21 and 22, respectively, except that chemical conversion treatment solution 16 was replaced with chemical conversion treatment solution 3 and the film thickness was changed from 1 μm to 0.5 μm as shown in Table 3 below. Each of chemical conversion-treated steel sheets 23 and 24 had the base material, the fluorine atom, the flake, and the chemical conversion treatment component with the same contents as that of chemical conversion treatment solution 3.

Examples 41 and 42

Chemical conversion-treated steel sheets 25 and 26 were obtained in the same manner as in the cases of chemical conversion-treated steel sheets 21 and 22, respectively, except that chemical conversion treatment solution 16 was replaced with chemical conversion treatment solution 10 as shown in Table 3 below. Each of chemical conversion-treated steel sheets 25 and 26 had the base material, the fluorine atom, the flake, and the chemical conversion treatment component with the same contents as that of chemical conversion treatment solution 10.

Comparative Examples 6 to 10

Chemical conversion-treated steel sheets C1 to C5 were obtained in the same manner as in the case of chemical conversion-treated steel sheet 1 except that the type and the film thickness of a chemical conversion treatment solution were changed as shown in Table 3 below. Each of chemical conversion-treated steel sheets C1 to C5 had the base material, the fluorine atom, the flake, and the chemical conversion treatment component with the same contents as those of chemical conversion treatment solutions 17 to 21.

[Evaluation]
(1) Gloss

For each of chemical conversion-treated steel sheets 1 to 26 and C1 to C5, the specular glossiness at 60° ($G_{60}$) of the surface on the chemical conversion treatment coating film side was measured with the gloss meter GMX-203 manufactured by MURAKAMI COLOR RESEARCH LABORATORY CO., Ltd. in accordance with "Specular glossiness-Methods of measurement" defined in JIS Z8741, and evaluation was performed by using the following criteria. "A" and "B" were regarded as a pass, and "C" and "D" were regarded as a fail.
A: the specular glossiness at 60° was 60 or lower.
B: the specular glossiness at 60° was higher than 60 and 150 or lower.
C: the specular glossiness at 60° was higher than 150 and 250 or lower.
D: the specular glossiness at 60° was higher than 250.

(2) Adhesion

A test piece was cut out of each of chemical conversion-treated steel sheets 1 to 26 and C1 to C5, and the test piece was bent to the chemical conversion treatment coating film side by a 4 t bend. The bent portion of the chemical conversion treatment coating film was subjected to a cellophane tape peeling test to determine the proportion of the peeled area of the chemical conversion treatment coating film per unit area in the bent portion (peeled area fraction of the coating film, PA), and evaluation was performed by using the following criteria. "A" and "B" were regarded as a pass, and "C" and "D" were regarded as a fail.
A: the peeled area fraction of the coating film was 5% or less.
B: the peeled area fraction of the coating film was more than 5% and 10% or less.
C: the peeled area fraction of the coating film was more than 10% and 50% or less.
D: the peeled area fraction of the coating film was more than 50%.

(3) Corrosion Resistance

A test piece was cut out of each of chemical conversion-treated steel sheets 1 to 26 and C1 to C5, and the edge surfaces of the test piece were sealed. The surface of the sealed test piece on the chemical conversion treatment coating film side was sprayed with a 5% NaCl aqueous solution at 35° C. for 240 hours in accordance with "Methods of salt spray testing" defined in JIS Z2371 to determine the area fraction of white rust generated on the surface (area fraction of white rust generation, WR), and evaluation was performed by using the following criteria. "A" and "B" were regarded as a pass, and "C" and "D" were regarded as a fail.
A: the area fraction of white rust generation was 5% or less.
B: the area fraction of white rust generation was more than 5% and 10% or less.
C: the area fraction of white rust generation was more than 10% and 40% or less.
D: the area fraction of white rust generation was more than 40%.

(4) Perspiration Resistance

A test piece was cut out of each of chemical conversion-treated steel sheets 1 to 26 and C1 to C5, and 100 μL of an artificial perspiration solution (alkaline) was dropped on the surface of the test piece on the chemical conversion treatment coating film side, and the portion was pressed with a rubber plug. Thereafter, the test piece was left to stand in a thermo-hygrostatic chamber having an inner environment of 70° C. and 95% RH for 240 hours. For the resultant test piece, the brightness difference (ΔL*) between the pressed portion and the other was measured, and evaluation was performed by using the following criteria. "A" and "B" were regarded as a pass, and "C" and "D" were regarded as a fail.
A: the brightness difference was 1 or lower.
B: the brightness difference was higher than 1 and 2 or lower.
C: the brightness difference was higher than 2 and 5 or lower.
D: the brightness difference was higher than 5.

(5) Weatherability

A test piece was cut out of each of chemical conversion-treated steel sheets 1 to 26 and C1 to C5, and the surface of the test piece on the chemical conversion treatment coating film side was subjected to a process in which a cycle (2 hours) consisting of water spray for 18 minutes during 120 minutes of irradiation with light from a xenon-arc lamp in accordance with a xenon lamp method defined in JIS K5600-7-7: 2008 was repeated 400 times. For the surface of the resultant test piece, the glossiness at 60° was measured with the gloss meter GMX-203 manufactured by MURAKAMI COLOR RESEARCH LABORATORY CO., Ltd. to determine the gloss retention rate of the test piece before and after 400 cycles (the rate of the glossiness of the test piece after the 400th cycle with respect to the glossiness of the test piece before the 50th cycle, $R_{G60}$), and evaluation was performed by using the following criteria. "A" and "B" were regarded as a pass, and "C" and "D" were regarded as a fail.

A: the gloss retention rate was 90% or higher.
B: the gloss retention rate was lower than 90% and 80% or higher.
C: the gloss retention rate was lower than 80% and 60% or higher.
D: the gloss retention rate was lower than 60%.

For each of chemical conversion-treated steel sheets 1 to 26 and C1 to C5, the type of a plated steel sheet, the type of a treatment solution, the thickness of a chemical conversion treatment coating film, and pretreatment are listed in Table 3, and the evaluation results are shown in Table 4.

TABLE 3

| | Chemical conversion-treated steel sheet No. | Plated steel sheet | Chemical conversion treatment solution No. | Drying temperature (° C.) | Film thickness (μm) | Pretreatment |
|---|---|---|---|---|---|---|
| Example 17 | 1 | A | 1 | 140 | 2.0 | — |
| Example 18 | 2 | A | 2 | 140 | 2.0 | — |
| Example 19 | 3 | A | 2 | 250 | 10.0 | — |
| Example 20 | 4 | A | 3 | 140 | 2.0 | — |
| Example 21 | 5 | A | 3 | 140 | 0.5 | — |
| Example 22 | 6 | A | 4 | 140 | 2.0 | — |
| Example 23 | 7 | A | 5 | 140 | 3.0 | — |
| Example 24 | 8 | A | 5 | 140 | 1.0 | — |
| Example 25 | 9 | A | 6 | 50 | 2.0 | — |
| Example 26 | 10 | A | 7 | 140 | 2.0 | — |
| Example 27 | 11 | A | 7 | 140 | 5.0 | — |
| Example 28 | 12 | A | 8 | 140 | 2.0 | — |
| Example 29 | 13 | A | 9 | 140 | 2.0 | — |
| Example 30 | 14 | A | 10 | 140 | 2.0 | — |
| Example 31 | 15 | A | 11 | 210 | 2.0 | — |
| Example 32 | 16 | A | 12 | 80 | 2.0 | — |
| Example 33 | 17 | A | 13 | 140 | 3.0 | — |
| Example 34 | 18 | A | 14 | 140 | 2.0 | — |
| Example 35 | 19 | A | 15 | 140 | 3.0 | — |
| Example 36 | 20 | A | 16 | 140 | 2.0 | — |
| Example 37 | 21 | A | 16 | 140 | 1.0 | phosphate |
| Example 38 | 22 | A | 16 | 140 | 1.0 | valve metal |
| Example 39 | 23 | A | 3 | 140 | 0.5 | phosphate |
| Example 40 | 24 | A | 3 | 140 | 0.5 | valve metal |
| Example 41 | 25 | A | 10 | 140 | 1.0 | phosphate |
| Example 42 | 26 | A | 10 | 140 | 1.0 | valve metal |
| Comparative Example 6 | C1 | A | 17 | 140 | 2.0 | — |
| Comparative Example 7 | C2 | A | 18 | 140 | 2.0 | — |
| Comparative Example 8 | C3 | A | 19 | 140 | 2.0 | — |
| Comparative Example 9 | C4 | A | 20 | 140 | 2.0 | — |
| Comparative Example 10 | C5 | A | 21 | 140 | 2.0 | — |

TABLE 4

| | Evaluation | | | | | | | | |
|---|---|---|---|---|---|---|---|---|---|
| | Gloss | | Adhesion PA | | Corrosion WR | | Perspiration ΔL* | | Weatherability $R_{G60}$ | |
| | $G_{60}$ | Grade | (%) | Grade | (%) | Grade | (—) | Grade | (%) | Grade |
| Example 17 | 72 | B | 8 | B | 6 | B | 1.42 | B | 95 | A |
| Example 18 | 45 | A | 2 | A | 0 | A | 0.85 | A | 93 | A |
| Example 19 | 25 | A | 1 | A | 0 | A | 0.22 | A | 98 | A |
| Example 20 | 38 | A | 4 | A | 7 | B | 0.45 | A | 95 | A |
| Example 21 | 120 | B | 6 | B | 6 | B | 1.83 | B | 85 | B |
| Example 22 | 50 | A | 0 | A | 8 | B | 1.21 | B | 94 | A |
| Example 23 | 55 | A | 0 | A | 6 | B | 0.61 | A | 88 | B |
| Example 24 | 98 | B | 0 | A | 7 | B | 1.59 | B | 82 | B |
| Example 25 | 68 | B | 0 | A | 0 | A | 1.46 | B | 84 | B |
| Example 26 | 63 | B | 3 | A | 0 | A | 1.22 | B | 95 | A |
| Example 27 | 30 | A | 2 | A | 0 | A | 0.41 | A | 98 | A |
| Example 28 | 64 | B | 2 | A | 0 | A | 1.30 | B | 93 | A |

TABLE 4-continued

| | Evaluation | | | | | | | | |
|---|---|---|---|---|---|---|---|---|---|
| | Gloss | | Adhesion PA | | Corrosion WR | | Perspiration ΔL* | | Weatherability $R_{G60}$ |  |
| | $G_{60}$ | Grade | (%) | Grade | (%) | Grade | (—) | Grade | (%) | Grade |
| Example 29 | 70 | B | 0 | A | 0 | A | 1.38 | B | 88 | B |
| Example 30 | 90 | B | 0 | A | 6 | B | 1.54 | B | 86 | B |
| Example 31 | 32 | A | 2 | A | 6 | B | 1.23 | B | 98 | A |
| Example 32 | 45 | A | 0 | A | 0 | A | 0.46 | A | 85 | B |
| Example 33 | 50 | A | 0 | A | 6 | B | 0.66 | A | 84 | B |
| Example 34 | 64 | B | 0 | A | 0 | A | 1.35 | B | 83 | B |
| Example 35 | 25 | A | 0 | A | 6 | B | 1.12 | B | 89 | B |
| Example 36 | 70 | B | 0 | A | 6 | B | 1.56 | B | 88 | B |
| Example 37 | 31 | A | 0 | A | 0 | A | 0.42 | A | 86 | B |
| Example 38 | 45 | A | 0 | A | 0 | A | 0.95 | A | 85 | B |
| Example 39 | 29 | A | 0 | A | 0 | A | 0.52 | A | 91 | A |
| Example 40 | 35 | A | 0 | A | 0 | A | 0.65 | A | 86 | B |
| Example 41 | 52 | A | 0 | A | 0 | A | 0.91 | A | 85 | B |
| Example 42 | 58 | A | 0 | A | 0 | A | 0.95 | A | 80 | B |
| Comparative Example 6 | 65 | B | 80 | D | 7 | B | 2.35 | C | 98 | A |
| Comparative Example 7 | 63 | B | 0 | A | 9 | B | 1.25 | B | 25 | D |
| Comparative Example 8 | 64 | B | 0 | A | 8 | B | 1.34 | B | 20 | D |
| Comparative Example 9 | 270 | D | 0 | A | 7 | B | 6.32 | D | 85 | B |
| Comparative Example 10 | 28 | A | 70 | D | 30 | C | 0.32 | A | 82 | B |

As is clear from Tables 1 to 4, chemical conversion-treated steel sheets 1 to 26 each of which included a chemical conversion treatment coating film produced by using one of chemical conversion treatment solutions 1 to 16 showed good results in the gloss of the surface of a chemical conversion-treated steel sheet on the chemical conversion treatment coating film side, and the adhesion, corrosion resistance, perspiration resistance, and weatherability of a chemical conversion treatment coating film.

In contrast, chemical conversion-treated steel sheet C1 was insufficient in adhesion. This is presumably because the chemical conversion treatment coating film was insufficiently adhered to the plating layer due to the fact that the chemical conversion treatment coating film did not contain an organic resin other than the fluororesin, and the chemical conversion treatment coating film had an insufficient barrier function to the artificial perspiration solution.

Chemical conversion-treated steel sheets C2 and C3 were insufficient in weatherability. This is presumably because the chemical conversion treatment coating film did not contain the fluororesin. From the results of chemical conversion-treated steel sheets C1 to C3, it can be seen that the matrix of a resin component in the chemical conversion treatment coating film essentially consists of a fluororesin and a base resin.

Chemical conversion-treated steel sheet C4 had too high a gloss and was insufficient in perspiration resistance. This is presumably because the effect to suppress gloss was insufficient due to the insufficient content of the metal flake, and a sufficiently homogenous distribution of the metal flakes was not achieved in the plane direction of the chemical conversion-treated steel sheet to cause the discoloration of the plating layer.

Chemical conversion-treated steel sheet C5 was insufficient in adhesion. This is presumably because the chemical conversion treatment coating film had an insufficient adhesion to the plating layer due to an excessive content of the metal flake.

[Production of Al-Containing Zn Alloy-Plated Steel Sheet]

Using an SPCC having a sheet thickness of 0.8 mm as a base material, plated steel sheets B to E each of which was a hot-dip Zn—Al—Mg alloy-plated steel sheet were produced in the same manner as in the case of plated steel sheet A except that the Zn content, Al content, and Mg content in a plating alloy were changed as shown in Table 5, and the amount of plating deposition was changed as shown in Table 5.

In addition, plated steel sheets F and G each of which was a hot-dip Zn—Al alloy-plated steel sheet were produced in the same manner as in the case of plated steel sheet A except that the Zn content and Al content in a plating alloy was changed as shown in Table 5, and the amount of plating deposition was changed as shown in Table 5.

The composition of a plating alloy and the amount of plating layer deposition for plated steel sheets B to G are listed in Table 5. In Table 5, "Al content" refers to the amount in mass % of aluminum in the plating layer, and "Mg content" refers to the amount in mass % of magnesium in the plating layer.

TABLE 5

| Plated steel sheet | Al content (mass %) | Mg content (mass %) | Amount of plating layer deposition (g/m²) |
|---|---|---|---|
| B | 11 | 3.0 | 45 |
| C | 4.0 | 1.0 | 60 |
| D | 2.5 | 3.0 | 90 |
| E | 55 | 2.5 | 60 |
| F | 0.18 | — | 60 |
| G | 55 | — | 45 |

Examples 43 to 47

As shown in Table 6 below, each of chemical conversion treatment solutions 2, 4, 7, and 14 was applied on plated steel sheet B, and heat-dried to a temperature of the plated steel sheet of 140° C. to form a chemical conversion treatment coating film having a film thickness of 2.0 μm. Thus, chemical conversion-treated steel sheets 27 to 30 were obtained. Further, chemical conversion treatment solution 15 was applied on plated steel sheet B, and heat-dried to a temperature of the plated steel sheet of 140° C. to form a chemical conversion treatment coating film having a film thickness of 3.0 μm. Thus, chemical conversion-treated steel sheet 31 was obtained. Chemical conversion-treated steel sheets 27 to 31 had the base material, the fluorine atom, the flake, and the chemical conversion treatment component, etc. with the same contents as those of chemical conversion treatment solutions 2, 4, 7, 14, and 15, respectively.

Examples 48 to 52

As shown in Table 6 below, chemical conversion-treated steel sheets 32 to 36 were obtained in the same manner as in the case of chemical conversion-treated steel sheets 27 to 31, respectively, except that plated steel sheet C was used in place of plated steel sheet B. Chemical conversion-treated steel sheets 32 to 36 had the base material, the fluorine atom, the flake, and the chemical conversion treatment component, etc. with the same contents as those of chemical conversion treatment solutions 2, 4, 7, 14, and 15, respectively.

Examples 53 to 57

As shown in Table 6 below, chemical conversion-treated steel sheets 37 to 41 were obtained in the same manner as in the case of chemical conversion-treated steel sheets 27 to 31, respectively, except that plated steel sheet D was used in place of plated steel sheet B. Chemical conversion-treated steel sheets 37 to 41 had the base material, the fluorine atom, the flake, and the chemical conversion treatment component, etc. with the same contents as those of chemical conversion treatment solutions 2, 4, 7, 14, and 15, respectively.

Examples 58 to 62

As shown in Table 6 below, chemical conversion-treated steel sheets 42 to 46 were obtained in the same manner as in the case of chemical conversion-treated steel sheets 27 to 31, respectively, except that plated steel sheet E was used in place of plated steel sheet B. Chemical conversion-treated steel sheets 42 to 46 had the base material, the fluorine atom, the flake, and the chemical conversion treatment component, etc. with the same contents as those of chemical conversion treatment solutions 2, 4, 7, 14, and 15, respectively.

Comparative Examples 11, 12

As shown in Table 6 below, chemical conversion-treated steel sheets C6 and C7 were obtained in the same manner as in the case of chemical conversion-treated steel sheet 31 except that chemical conversion treatment solutions 18 and 20 were used, respectively, in place of chemical conversion treatment solution 15. Chemical conversion-treated steel sheets C6 and C7 had the base material, the fluorine atom, the flake, and the chemical conversion treatment component, etc. with the same contents as those of chemical conversion treatment solutions 18 and 20, respectively.

Comparative Examples 13 to 18

As shown in Table 6 below, chemical conversion-treated steel sheets C8 and C13 were obtained in the same manner as in the case of chemical conversion-treated steel sheets C6 and C7, respectively, except that each of plated steel sheets C to E was used in place of plated steel sheet B. Chemical conversion-treated steel sheets C8 and C9, C10 and C11, and C12 and C13 had the base material, the fluorine atom, the flake, and the chemical conversion treatment component, etc. with the same contents as those of chemical conversion treatment solutions 18 and 20, respectively.

Comparative Examples 19 to 24

As shown in Table 6 below, chemical conversion-treated steel sheets C14 and C17 were obtained in the same manner as in the case of chemical conversion-treated steel sheets C6 and C7, respectively, except that each of plated steel sheets F and G was used in place of plated steel sheet B. Chemical conversion-treated steel sheets C18 and C19 had the base material, the fluorine atom, the flake, and the chemical conversion treatment component, etc. with the same contents as that of chemical conversion treatment solutions 2.

For chemical conversion-treated steel sheets 27 to 46 and C6 to C19, the gloss, adhesion, corrosion resistance, perspiration resistance, and weatherability were evaluated as in the case of chemical conversion-treated steel sheet 1. The type of a plated steel sheet, the type of a chemical conversion treatment solution, the drying temperature, and the thickness of a chemical conversion treatment coating film for each of chemical conversion-treated steel sheets 27 to 46 and C6 to C19 are listed in Table 6, and the evaluation results are shown in Table 7.

TABLE 6

| | Chemical conversion-treated steel sheet No. | Plated steel sheet | Chemical conversion treatment solution No. | Drying temperature (° C.) | Film thickness (μm) |
|---|---|---|---|---|---|
| Example 43 | 27 | B | 2 | 140 | 2.0 |
| Example 44 | 28 | B | 4 | 140 | 2.0 |
| Example 45 | 29 | B | 7 | 140 | 2.0 |
| Example 46 | 30 | B | 14 | 140 | 2.0 |
| Example 47 | 31 | B | 15 | 140 | 3.0 |
| Example 48 | 32 | C | 2 | 140 | 2.0 |
| Example 49 | 33 | C | 4 | 140 | 2.0 |
| Example 50 | 34 | C | 7 | 140 | 2.0 |
| Example 51 | 35 | C | 14 | 140 | 2.0 |
| Example 52 | 36 | C | 15 | 140 | 3.0 |
| Example 53 | 37 | D | 2 | 140 | 2.0 |
| Example 54 | 38 | D | 4 | 140 | 2.0 |
| Example 55 | 39 | D | 7 | 140 | 2.0 |
| Example 56 | 40 | D | 14 | 140 | 2.0 |
| Example 57 | 41 | D | 15 | 140 | 3.0 |
| Example 58 | 42 | E | 2 | 140 | 2.0 |
| Example 59 | 43 | E | 4 | 140 | 2.0 |
| Example 60 | 44 | E | 7 | 140 | 2.0 |
| Example 61 | 45 | E | 14 | 140 | 2.0 |
| Example 62 | 46 | E | 15 | 140 | 3.0 |
| Comparative Example 11 | C6 | B | 18 | 140 | 3.0 |
| Comparative Example 12 | C7 | B | 20 | 140 | 3.0 |
| Comparative Example 13 | C8 | C | 18 | 140 | 3.0 |
| Comparative Example 14 | C9 | C | 20 | 140 | 3.0 |

TABLE 6-continued

| | Chemical conversion-treated steel sheet No. | Plated steel sheet | Chemical conversion treatment solution No. | Drying temperature (° C.) | Film thickness (μm) |
|---|---|---|---|---|---|
| Comparative Example 15 | C10 | D | 18 | 140 | 3.0 |
| Comparative Example 16 | C11 | D | 20 | 140 | 3.0 |
| Comparative Example 17 | C12 | E | 18 | 140 | 3.0 |
| Comparative Example 18 | C13 | E | 20 | 140 | 3.0 |
| Comparative Example 19 | C14 | F | 18 | 140 | 3.0 |
| Comparative Example 20 | C15 | F | 20 | 140 | 3.0 |
| Comparative Example 21 | C16 | G | 18 | 140 | 3.0 |
| Comparative Example 22 | C17 | G | 20 | 140 | 3.0 |
| Comparative Example 23 | C18 | F | 2 | 140 | 2.0 |
| Comparative Example 24 | C19 | G | 2 | 140 | 2.0 |

TABLE 7

| | Evaluation | | | | | | | | | |
|---|---|---|---|---|---|---|---|---|---|---|
| | | | Adhesion | | Corrosion | | Perspiration | | Weatherability | |
| | Gloss | | PA | | WR | | ΔL* | | $R_{G60}$ | |
| | $G_{60}$ | Evaluation | (%) | Evaluation | (%) | Evaluation | (—) | Evaluation | (%) | Evaluation |
| Example 43 | 48 | A | 2 | A | 0 | A | 0.95 | A | 92 | A |
| Example 44 | 55 | A | 0 | A | 8 | B | 1.35 | B | 93 | A |
| Example 45 | 64 | B | 3 | A | 0 | A | 1.23 | B | 93 | A |
| Example 46 | 66 | B | 0 | A | 0 | A | 1.33 | B | 80 | B |
| Example 47 | 28 | A | 0 | A | 6 | B | 1.13 | B | 85 | B |
| Example 48 | 45 | A | 2 | A | 0 | A | 0.85 | A | 92 | A |
| Example 49 | 50 | A | 0 | A | 8 | B | 1.25 | B | 93 | A |
| Example 50 | 63 | B | 3 | A | 0 | A | 1.23 | B | 94 | A |
| Example 51 | 64 | B | 0 | A | 0 | A | 1.36 | B | 80 | B |
| Example 52 | 25 | A | 0 | A | 6 | B | 1.21 | B | 85 | B |
| Example 53 | 45 | A | 2 | A | 0 | A | 0.92 | A | 92 | A |
| Example 54 | 50 | A | 0 | A | 8 | B | 1.23 | B | 93 | A |
| Example 55 | 63 | B | 3 | A | 0 | A | 1.25 | B | 94 | A |
| Example 56 | 64 | B | 0 | A | 0 | A | 1.36 | B | 80 | B |
| Example 57 | 25 | A | 0 | A | 6 | B | 1.15 | B | 85 | B |
| Example 58 | 40 | A | 2 | A | 0 | A | 0.93 | A | 95 | A |
| Example 59 | 45 | A | 0 | A | 8 | B | 1.22 | B | 93 | A |
| Example 60 | 56 | A | 3 | A | 0 | A | 1.25 | B | 92 | A |
| Example 61 | 52 | A | 0 | A | 0 | A | 1.32 | B | 81 | B |
| Example 62 | 23 | A | 0 | A | 6 | B | 1.22 | B | 88 | B |
| Comparative Example 11 | 65 | B | 0 | A | 9 | B | 1.32 | B | 21 | D |
| Comparative Example 12 | 260 | D | 0 | A | 8 | B | 7.54 | D | 83 | B |
| Comparative Example 13 | 67 | B | 0 | A | 9 | B | 1.35 | B | 22 | D |
| Comparative Example 14 | 280 | D | 0 | A | 8 | B | 7.25 | D | 84 | B |
| Comparative Example 15 | 67 | B | 0 | A | 9 | B | 1.23 | B | 23 | D |
| Comparative Example 16 | 275 | D | 0 | A | 7 | B | 7.12 | D | 81 | B |
| Comparative Example 17 | 50 | A | 0 | A | 8 | B | 1.22 | B | 24 | D |
| Comparative Example 18 | 55 | A | 0 | A | 7 | B | 6.3 | D | 86 | B |
| Comparative Example 19 | 75 | B | 0 | A | 70 | D | 1.2 | B | 25 | D |
| Comparative Example 20 | 291 | D | 0 | A | 50 | D | 4.5 | C | 86 | B |
| Comparative Example 21 | 50 | A | 0 | A | 30 | C | 1.1 | B | 30 | D |
| Comparative Example 22 | 55 | A | 0 | A | 20 | C | 3.2 | C | 89 | B |
| Comparative Example 23 | 58 | A | 2 | A | 50 | D | 0.95 | A | 92 | A |
| Comparative Example 24 | 45 | A | 2 | A | 20 | C | 0.85 | A | 94 | A |

As is clear from Tables 6 and 7, chemical conversion-treated steel sheets 27 to 46 each of which included a chemical conversion treatment coating film produced by using one of chemical conversion treatment solutions 2, 4, 7, 14, and 15 showed good results in the gloss of the surface of a chemical conversion-treated steel sheet on the chemical conversion treatment coating film side, and the adhesion, corrosion resistance, perspiration resistance, and weatherability of a chemical conversion treatment coating film.

Chemical conversion-treated steel sheets C6, C8, C10, and C12 were insufficient in weatherability. This is presumably because the chemical conversion treatment coating film did not contain the fluororesin.

Chemical conversion-treated steel sheets C7, C9, C11, and C13 were insufficient in perspiration resistance. This is presumably because, due to the insufficient content of the metal flake, a sufficiently homogenous distribution of the metal flakes was not achieved in the plane direction of the chemical conversion-treated steel sheet to cause the discoloration of the plating layer. In particular, chemical conversion-treated steel sheets C7, C9, and C11 were insufficient also in terms of an effect to suppress gloss because of the insufficient content of the metal flake. Chemical conversion-treated steel sheet C13 had a sufficiently low gloss, and this is because plated steel sheet E was a plated steel sheet having a sufficiently low surface gloss.

Chemical conversion-treated steel sheets C14 to C17 were insufficient in corrosion resistance. This is because plated steel sheets F and G were both a plated steel sheet having a low corrosion resistance and thus the corrosion resistance was not enhanced sufficiently even after chemical conversion treatment. Further, chemical conversion-treated steel sheets C14 and C16 were insufficient also in weatherability because the chemical conversion treatment coating film did not contain the fluororesin. Chemical conversion-treated steel sheets C15 and C17 were insufficient in perspiration resistance. This is presumably because a sufficiently homogenous distribution of the metal flakes was not achieved in the plane direction of the chemical conversion-treated steel sheet to cause the discoloration of the plating layer. In particular, chemical conversion-treated steel sheet C15 was insufficient also in terms of an effect to suppress gloss because of the insufficient content of the metal flake.

Chemical conversion-treated steel sheets C18 and C19 were in sufficient in corrosion resistance. This is because plated steel sheets F and G were both a plated steel sheet having a low corrosion resistance and thus the corrosion resistance was not enhanced sufficiently even after chemical conversion treatment.

From the above results, it was found that a chemical conversion-treated steel sheet including a chemical conversion treatment coating film disposed on the surface of the plating layer of the plated steel sheet, in which the chemical conversion treatment coating film contains a fluororesin, a base resin, a metal flake, and a chemical conversion treatment component, the base resin is one or more selected from the group consisting of a polyurethane, a polyester, an acrylic resin, an epoxy resin, and a polyolefin, the content of the fluororesin relative to the total amount of the fluororesin and the base resin is 3.0 mass % or more in terms of fluorine atoms, the content of the base resin relative to 100 parts by mass of the fluororesin is 10 parts by mass or more, and the content of the metal flake in the chemical conversion treatment coating film is more than 20 mass % and 60 mass % or less, has weatherability and exhibits suppressed gloss and suppressed discoloration over time.

The present application claims priority based on Japanese Patent Application No. 2014-066481 filed on Mar. 27, 2014, Japanese Patent Application No. 2014-221602 filed on Oct. 30, 2014, Japanese Patent Application No. 2014-265602 filed on Dec. 26, 2014, and Japanese Patent Application No. 2015-065617 filed on Mar. 27, 2015. The contents disclosed in these specifications and drawings are incorporated herein by reference in their entirety.

INDUSTRIAL APPLICABILITY

The chemical conversion-treated steel sheet is excellent in weatherability with an excessive gloss and discoloration over time suppressed, and thus is useful for various applications such as exterior building materials. For example, the chemical conversion-treated steel sheet can be suitably used for applications such as 1) roofing and exterior materials for a building, 2) steel pipes, shape steels, poles, beams for a PVC greenhouse or agricultural greenhouse, and members for conveyance, 3) sound insulation walls, soundproof walls, sound absorption walls, snow protection walls, guardrails, balustrades, protection fences, and struts, and 4) members for railroad vehicles, members for overhead lines, members for electric facilities, members for safe environment, structural members, mounts for photovoltaic power generation, and outdoor units of an air conditioner.

REFERENCE SIGNS LIST

10 CHEMICAL CONVERSION-TREATED STEEL SHEET
11 STEEL SHEET
12 CHEMICAL CONVERSION TREATMENT COATING FILM
13 METAL FLAKE
14 WAX
15 4A METAL COMPOUND
16 SILANE COUPLING AGENT
17 PLATING LAYER

The invention claimed is:

1. A chemical conversion-treated steel sheet comprising: a plated steel sheet including a steel sheet and a plating layer disposed on a surface of the steel sheet; and a chemical conversion treatment coating film disposed on a surface of the plating layer, wherein:
the plating layer contains a zinc alloy containing 0.05 to 60 mass % of aluminum and 0.5 to 4.0 mass % of magnesium,
the chemical conversion treatment coating film contains a fluororesin, a base resin, a metal flake, and a chemical conversion treatment component,
a content of the base resin relative to 100 parts by mass of the fluororesin in the chemical conversion treatment coating film is 100 parts by mass or more,
the base resin is one or more selected from the group consisting of a polyurethane, a polyester, an acrylic resin, an epoxy resin, and a polyolefin,
a content of the fluororesin relative to a total amount of the fluororesin and the base resin is 3.0 mass % or more in terms of fluorine atoms,
a content of the metal flake in the chemical conversion treatment coating film is more than 20 mass % and 60 mass % or less,
a metal material for the metal flake is one or more metal materials selected from the group consisting of aluminum and alloys thereof, iron and alloys thereof, copper and alloys thereof, silver, nickel, and titanium, the chemical conversion treatment component is one or more compounds selected from the group consisting of a 4A metal compound, a molybdate and a valve metal compound, the 4A metal compound is a compound including one or more selected from the group consisting of Ti, Zr, and Hf, and the valve metal compound is a compound including one or both of V and Nb.

2. The chemical conversion-treated steel sheet according to claim 1, wherein the chemical conversion treatment coating film has a film thickness of 0.5 to 10 μm.

3. The chemical conversion-treated steel sheet according to claim 1, wherein the content of the base resin relative to 100 parts by mass of the fluororesin in the chemical conversion treatment coating film is 100 parts by mass or more and 900 parts by mass or less.

4. The chemical conversion-treated steel sheet according to claim 1, wherein a content of the 4A metal compound in the chemical conversion treatment coating film based on the chemical conversion treatment coating film is 0.005 to 5.0 mass % in terms of 4A metal.

5. The chemical conversion-treated steel sheet according to claim 1, wherein the chemical conversion treatment coating film further contains one or both of a silane coupling agent and a phosphate.

6. The chemical conversion-treated steel sheet according to claim 1, wherein the chemical conversion-treated steel sheet further includes a pretreatment coating film which contains a phosphate compound or a valve metal component, the pretreatment coating film being disposed between the plated steel sheet and the chemical conversion treatment coating film, the phosphate compound is a metal phosphate or a composite phosphate, and the valve metal component is an oxide, a hydroxide, or a fluoride containing one or more selected from the group consisting of Ti, Zr, Hf, V, Nb, Ta, Mo, and W.

7. The chemical conversion-treated steel sheet according to claim 1, wherein the chemical conversion treatment coating film further contains a pigment.

8. The chemical conversion-treated steel sheet according to claim 1, wherein the chemical conversion treatment coating film further contains a wax.

9. A method for producing a chemical conversion-treated steel sheet comprising: applying a chemical conversion treatment solution on a plating layer of a plated steel sheet; and drying the applied chemical conversion treatment solution to manufacture the chemical conversion-treated steel sheet, wherein:

the plating layer is composed of a zinc alloy containing 0.05 to 60 mass % of aluminum and 0.5 to 4.0 mass % of magnesium, the chemical conversion treatment solution contains an emulsion of a fluororesin, an emulsion of a base resin, a metal flake, and a pre-chemical conversion treatment component, a particle diameter of the emulsion of the fluororesin is 10 to 300 nm, a particle diameter of the emulsion of the base resin is 10 to 100 nm, the base resin is one or more selected from the group consisting of a polyurethane, a polyester, an acrylic resin, an epoxy resin, and a polyolefin, a content of the fluororesin relative to a total amount of the fluororesin and the base resin in the chemical conversion treatment solution is 3.0 mass % or more in terms of fluorine atoms, a content of the base resin relative to 100 parts by mass of the fluororesin in the chemical conversion treatment solution is 10 parts by mass or more, and a content of the metal flake relative to a solid content in the chemical conversion treatment solution is more than 20 mass % and 60 mass % or less, a metal material for the metal flake is one or more metal materials selected from the group consisting of aluminum and alloys thereof, iron and alloys thereof, copper and alloys thereof, silver, nickel, and titanium, the pre-chemical conversion treatment component is one or both of a chemical conversion treatment component and a component which changes to the pre-chemical conversion treatment component in the chemical conversion treatment solution or through drying the chemical conversion treatment solution, the chemical conversion treatment component is one or more compounds selected from the group consisting of a 4A metal compound, a molybdate and a valve metal compound, the 4A metal compound is a compound including one or more selected from the group consisting of Ti, Zr, and Hf, and, the valve metal compound is a compound including one or both of V and Nb.

10. The method for producing a chemical conversion-treated steel sheet according to claim 9, further comprising pretreating the plated steel sheet with a phosphate compound or a valve metal component before applying the chemical conversion treatment solution, wherein the phosphate compound is a metal phosphate or a composite phosphate, and the valve metal component is an oxide, a hydroxide, or a fluoride containing one or more selected from the group consisting of Ti, Zr, Hf, V, Nb, Ta, Mo, and W.

11. A chemical conversion treatment solution comprising: an emulsion of a fluororesin, an emulsion of a base resin, a metal flake, and a pre-chemical conversion treatment component, wherein:

a particle diameter of the emulsion of the fluororesin is 10 to 300 nm, a particle diameter of the emulsion of the base resin is 10 to 100 nm, the base resin is one or more selected from the group consisting of a polyurethane, a polyester, an acrylic resin, an epoxy resin, and a polyolefin, a content of the fluororesin relative to a total amount of the fluororesin and the base resin in the chemical conversion treatment solution is 3.0 mass % or more in terms of fluorine atoms, a content of the base resin relative to 100 parts by mass of the fluororesin in the chemical conversion treatment solution is 10 parts by mass or more, and a content of the metal flake relative to a solid content in the chemical conversion treatment solution is more than 20 mass % and 60 mass % or less, a metal material for the metal flake is one or more metal materials selected from the group consisting of aluminum and alloys thereof, iron and alloys thereof, copper and alloys thereof, silver, nickel, and titanium, the pre-chemical conversion treatment component is one or both of a chemical conversion treatment component and a component which changes to the chemical conversion treatment component in the chemical conversion treatment solution or through drying the chemical conversion treatment solution, the chemical conversion treatment component is one or more compounds selected from the group consisting of a 4A metal compound, a molybdate and a valve metal compound, the 4A metal compound is a compound including one or more selected from the group consisting of Ti, Zr, and Hf, and, the valve metal compound is a compound including one or both of V and Nb.

* * * * *